US012570367B2

(12) United States Patent
Scruggs et al.

(10) Patent No.: US 12,570,367 B2
(45) Date of Patent: **\*Mar. 10, 2026**

(54) FIFTH WHEEL HITCH WITH LATCHING SYSTEM

(71) Applicant: HORIZON GLOBAL AMERICAS INC., Plymouth, MI (US)

(72) Inventors: Mark Scruggs, Plymouth, MI (US); Curt Nowack, Plymouth, MI (US)

(73) Assignee: HORIZON GLOBAL AMERICAS INC., Plymouth, MI (US)

( \* ) Notice: Subject to any disclaimer, the term of this patent is extended or adjusted under 35 U.S.C. 154(b) by 701 days.

This patent is subject to a terminal disclaimer.

(21) Appl. No.: 17/866,913

(22) Filed: Jul. 18, 2022

(65) Prior Publication Data

US 2023/0150590 A1 May 18, 2023

Related U.S. Application Data

(63) Continuation of application No. 16/728,542, filed on Dec. 27, 2019, now Pat. No. 11,390,339.

(60) Provisional application No. 62/785,306, filed on Dec. 27, 2018.

(51) Int. Cl.
*B62D 53/08* (2006.01)
*B62D 53/10* (2006.01)

(52) U.S. Cl.
CPC ..... *B62D 53/0807* (2013.01); *B62D 53/0878* (2013.01); *B62D 53/10* (2013.01)

(58) Field of Classification Search
CPC . B62D 53/0807; B62D 53/0878; B62D 53/10
See application file for complete search history.

(56) References Cited

U.S. PATENT DOCUMENTS

| | | | |
|---|---|---|---|
| 3,239,239 A | 3/1966 | Worden | |
| 6,467,791 B1 | 10/2002 | Fandrich et al. | |
| 7,806,424 B2 * | 10/2010 | Burns | B62D 53/0814 |
| | | | 280/441 |
| 7,938,429 B2 | 5/2011 | Mann et al. | |
| 8,960,705 B2 * | 2/2015 | McCall | B60D 1/015 |
| | | | 280/438.1 |
| 9,186,942 B1 | 11/2015 | Waggoner et al. | |
| 9,511,804 B2 | 12/2016 | Curl | |
| 9,849,738 B2 | 12/2017 | Guthard | |
| 10,479,425 B2 * | 11/2019 | Curl | B62D 53/0814 |
| 2004/0145151 A1 * | 7/2004 | Grinde | B62D 53/0828 |
| | | | 280/438.1 |
| 2012/0018977 A1 | 1/2012 | Stanifer | |
| 2012/0018978 A1 | 1/2012 | McCoy | |
| 2013/0099464 A1 * | 4/2013 | Peterson | B60D 1/48 |
| | | | 280/407 |

* cited by examiner

*Primary Examiner* — Valentin Neacsu
*Assistant Examiner* — Marlon A Arce
(74) *Attorney, Agent, or Firm* — DAY PITNEY LLP; Richard B. Emmons; Christopher J. Head

(57) ABSTRACT

The present disclosure relates generally to a fifth wheel hitch and, more particularly, to a fifth wheel hitch having a latching system that is viewable to a user. In another instance, the present disclosure relates to a fifth wheel hitch having a latching system that permits a user to restrict movement of the fifth wheel hitch in at least two different planes of motion.

16 Claims, 22 Drawing Sheets

550        542        546

610

FIFTH WHEEL HITCH WITH LATCHING SYSTEM

CROSS-REFERENCE TO RELATED APPLICATIONS

This application claims the priority to U.S. Provisional Patent App. No. 62/785,306 entitled "FIFTH WHEEL HITCH WITH LATCHING SYSTEM" and filed on Dec. 27, 2018 which is incorporated by reference in its entirety.

FIELD OF THE DISCLOSURE

The present disclosure relates generally to a fifth wheel hitch and, more particularly, to a fifth wheel hitch having a latching system. In another instance, the present disclosure relates to a fifth wheel hitch having a latching system that permits a user to restrict movement of the fifth wheel hitch in at least two different planes of motion.

BACKGROUND

The towing industry has developed a number of methods and apparatuses for securing a towed vehicle to a towing vehicle. One particularly prevalent towing apparatus is a fifth wheel hitch. The fifth wheel hitch is normally positioned in a load bed of a towing vehicle and secured either to the load bed or directly to the frame of the towing vehicle. A fifth wheel trailer typically includes a king pin that operatively couples the towed vehicle to the towing vehicle.

Fifth wheel hitches may normally be arranged such that the king pin is aligned over or near the rear axle and approximately equidistant between the rear wheels of the towing vehicle. Placing the king pin over the rear axle may also provide for sufficient clearance between the front edge of the trailer and the rear edge of the towing vehicle cabin when standard sized towing and towed vehicle are involved.

However, there are more towing vehicles on the market that include extended cabs having an expanded interior cargo volume. These extended cab towing vehicles, however, are typically built on a standard wheelbase chassis. This results in the load bed being shorter than standard towing vehicles. These shorter load beds result in the towing vehicles not having sufficient clearance between the axle and the rear of the cab to allow the towed vehicle to pivot appropriately.

Various fifth wheel hitches are available that permit movement in at least one plane of motion, such as forward and backward relative to the long direction of the bed of the towing vehicle. Such fifth wheel hitches generally use a sliding base that requires the operator to exit the towing vehicle, unlock the base, lock the brakes on the towed vehicle and pull the towing vehicle forward. This temporarily moves the pivot point rearward so that the towed vehicle can pivot relative to the towing vehicle. However, before resuming normal operation, the operator must lock the towed vehicle brakes, back the towing vehicle towards the towed vehicle, again exit the towing vehicle and lock the sliding hitch.

Additionally, fifth wheel hitches are available that are positionable in order to maintain the appropriate operative position of the towed vehicle relative to the towing vehicle that is robust, easy to maintain and does not require operator intervention.

However, to date the various fifth wheel hitches available lack a suitable latching system that permits an operator to ascertain with greater ease the state of the latching system and/or to operate such latching system with improved ease while achieving restriction of motion of the fifth wheel hitch in at least one, or even two or more, planes of motion.

SUMMARY

The present disclosure relates generally to a fifth wheel hitch and, more particularly, to a fifth wheel hitch having a latching system. In another instance, the present disclosure relates to a fifth wheel hitch having a latching system that permits a user to restrict movement of the fifth wheel hitch in at least two different planes of motion.

In one embodiment, the fifth wheel hitch of the present disclosure comprises a fifth wheel hitch having a latching system that restricts the movement of the fifth wheel hitch in at least one plane of motion.

In one embodiment, the fifth wheel hitch of the present disclosure comprises a fifth wheel hitch having a latching system that restricts the movement of the fifth wheel hitch in at least two planes of motion.

In one embodiment, the fifth wheel hitch of the present disclosure comprises a fifth wheel hitch having a latching system that restricts the movement of the fifth wheel hitch in at least one plane of motion, where the fifth wheel latching system comprises at least one arced latching member on either side of the fifth wheel hitch (i.e., the left and right sides of the fifth wheel hitch when viewed from the rear of the hitch or vehicle in which the hitch is installed).

In one embodiment, the fifth wheel hitch of the present disclosure comprises a fifth wheel hitch having a latching system that restricts the movement of the fifth wheel hitch in at least two planes of motion, where the fifth wheel latching system comprises at least one arced latching member on either side of the fifth wheel hitch (i.e., the left and right sides of the fifth wheel hitch when viewed from the rear of the hitch or vehicle in which the hitch is installed).

In one embodiment, the fifth wheel hitch of the present disclosure comprises a fifth wheel hitch having a latching system that restricts the movement of the fifth wheel hitch in at least one plane of motion, where the fifth wheel latching system comprises at least two arced latching members on either side of the fifth wheel hitch (i.e., the left and right sides of the fifth wheel hitch when viewed from the rear of the hitch or vehicle in which the hitch is installed).

In one embodiment, the fifth wheel hitch of the present disclosure comprises a fifth wheel hitch having a latching system that restricts the movement of the fifth wheel hitch in at least two planes of motion, where the fifth wheel latching system comprises at least two arced latching members on either side of the fifth wheel hitch (i.e., the left and right sides of the fifth wheel hitch when viewed from the rear of the hitch or vehicle in which the hitch is installed).

Also, provided is a fifth wheel hitch assembly comprising a fifth wheel head configured to engage a towed vehicle, a carriage member attached to said fifth wheel head, a frame configured to be attached to a towing vehicle, said frame including at least one locating rail wherein said carriage is moveable along the locating rail. A latching system positioned along the frame that is configured to restrict the movement of the carriage relative to the frame. Said carriage member may include a first sliding tower spaced from a second sliding tower and said frame includes a first locator rail spaced from and generally perpendicular to a second locator rail wherein said first sliding tower is movably attached to the first locating rail and the second sliding tower is movably attached to said second locator rail. The latching system may include at least one latching finger configured to be selectively engaged with at least one receptacle positioned along the carriage member, the latching system is in a locked positioned when the latching finger is engaged to the receptacle and is in an unlocked position when the latching finger is not engaged to the receptacle, wherein movement of the carriage member relative to the frame is restricted along at least a first plane of motion when the latching system is in the locked position. The at least one receptacle may be located along an exposed surface of the carriage member to allow a user to view said latching finger in the locked position. The latching system may further comprise a plurality of latch fingers positioned along a control bar. The plurality of latch fingers positioned along the control bar may include a first latch finger and a second latch finger positioned along either side of said locator rail and a third latch finger and a fourth latch finger positioned along either side of a second locator rail spaced from said locator rail.

The at least one latch finger may be shaped in an arched configuration and the at least one receptacle may include a generally complementary shape to the at least one latch finger. A latch control handle may be attached to a control bar and be configured to pivot the control bar and the at least one latch finger relative to the at least one receptacle positioned along the carriage member. The latching handle may comprise a secondary lockable safety mechanism. An extension handle may be configured to be attached to and extend from the latch control handle to allow a user to pivot the control bar from the extension handle. The frame may further comprise at least one set of a threaded eye bolt and nut configured to facilitate structural attachment to at least one rail positioned along a vehicle wherein the set of said threaded eye bolt and said nut are configured to prevent rattle, movement and/or noise from a fifth wheel hitch. The control bar may be attached to a biasing member that is configured to be spring loaded in a direction which will force the at least one latch fingers to pivot towards or otherwise engage with the at least one latch receptacle. A retaining spring may be configured to selectively engage the at least one latching finger to prevent said at least one latching finger from re-engaging with one or more receptacles such that the carriage member is free to move relative to the frame when the retaining spring is engaged to the at least one latching finger. The retaining spring may comprise a spring portion, an engagement surface, and a depressible portion wherein the spring portion may be configured to provide a bias force to position the engagement surface towards the latch finger. The engagement surface may be configured to selectively abut against an end of the latch finger to prevent the latch finger from pivoting towards the respective receptacle. The depressible portion may be configured to be manually depressed by a user to disengage the engagement surface from the latch finger to allow the latch finger to be pivoted or otherwise engage with the respective receptacle.

In another embodiment, provided is a fifth wheel hitch assembly comprising a fifth wheel head configured to engage a towing vehicle, a carriage member attached to said fifth wheel head, a frame configured to be attached to a towing vehicle, said frame including at least one locating rail wherein said carriage is moveable along the locating rail and a latching system. The latching system may be positioned along the frame and be configured to restrict the movement of the carriage relative to the frame. Said latching system comprising at least one latching finger configured to be selectively engaged with at least one receptacle positioned along the carriage member, a control bar configured to pivot the at least one latching finger to selectively engage the at least one receptacle and a latch control handle attached to said control bar configured to pivot the control bar and the at least one latch finger relative to the at least one receptacle. The latching system may be in a locked positioned when the latching finger is engaged to the receptacle and is in an unlocked position when the latching finger is not engaged to the receptacle. Movement of the carriage member relative to the frame may be restricted along at least a first plane of motion when the latching system in in the locked position. The at least one receptacle may be located along an exposed surface of the carriage member to allow a user to view said latching finger in the locked position. The at least one latch finger may be shaped in an arched configuration and the at least one receptacle includes a generally complementary shape as the at least one latch finger. An extension handle may be attached to and extend from the latch control handle to allow a user to pivot the control bar from the extension handle. The control bar may be attached to a biasing member and may be configured to be spring loaded in a direction which will force the at least one latch fingers to pivot towards or otherwise engage with the at least one latch receptacle. A retaining spring may be configured to selectively prevent the at least one latching finger from re-engaging with the at least one receptacle.

DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings.

DESCRIPTION OF THE DISCLOSURE

Figure 1:
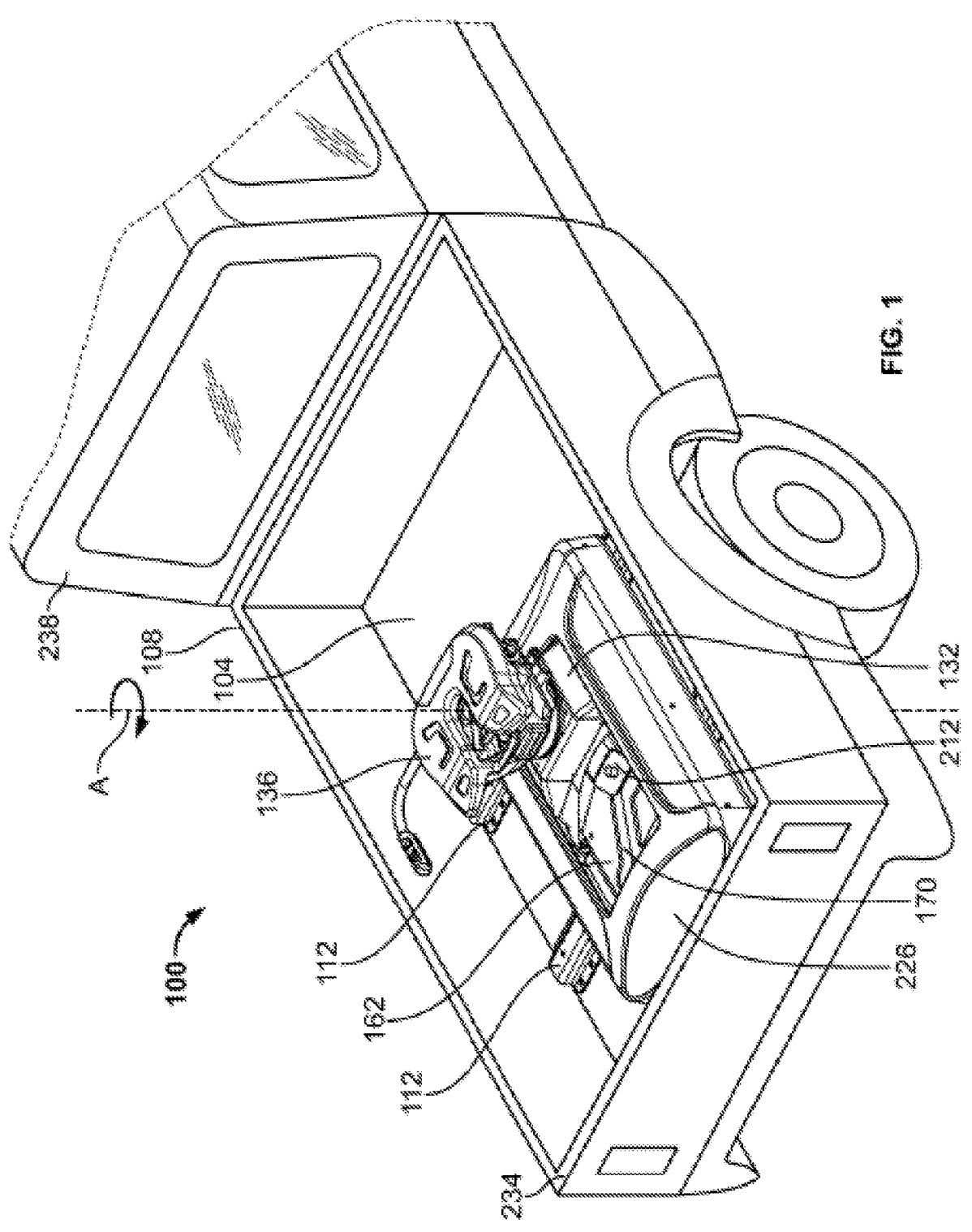
FIG. 1 is a perspective view of an automatic rolling fifth wheel hitch selectively secured with a load bed of a towing vehicle.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Reference will now be made in detail to exemplary embodiments of the present disclosure, examples of which are illustrated in the accompanying drawings. It is to be understood that other embodiments may be utilized and structural and functional changes may be made without departing from the respective scope of the disclosure. Moreover, features of the various embodiments may be combined or altered without departing from the scope of the disclosure. As such, the following description is presented by way of illustration only and should not limit in any way the various alternatives and modifications that may be made to the illustrated embodiments and still be within the spirit and scope of the disclosure.

The present disclosure relates generally to a fifth wheel hitch and, more particularly, to a fifth wheel hitch having a latching system. In another instance, the present disclosure relates to a fifth wheel hitch having a latching system that permits a user to restrict movement of the fifth wheel hitch in at least two different planes of motion.

In one embodiment, the fifth wheel hitch of the present disclosure comprises a fifth wheel hitch having a latching system that restricts the movement of the fifth wheel hitch in at least one plane of motion.

In one embodiment, the fifth wheel hitch of the present disclosure comprises a fifth wheel hitch having a latching system that restricts the movement of the fifth wheel hitch in at least two planes of motion.

In one embodiment, the fifth wheel hitch of the present disclosure comprises a fifth wheel hitch having a latching system that restricts the movement of the fifth wheel hitch in at least one plane of motion, where the fifth wheel latching system comprises at least one arced latching member on either side of the fifth wheel hitch (i.e., the left and right sides of the fifth wheel hitch when viewed from the rear of the hitch or vehicle in which the hitch is installed).

In one embodiment, the fifth wheel hitch of the present disclosure comprises a fifth wheel hitch having a latching system that restricts the movement of the fifth wheel hitch in at least two planes of motion, where the fifth wheel latching system comprises at least one arced latching member on either side of the fifth wheel hitch (i.e., the left and right sides of the fifth wheel hitch when viewed from the rear of the hitch or vehicle in which the hitch is installed).

In one embodiment, the fifth wheel hitch of the present disclosure comprises a fifth wheel hitch having a latching system that restricts the movement of the fifth wheel hitch in at least one plane of motion, where the fifth wheel latching system comprises at least two arced latching members on either side of the fifth wheel hitch (i.e., the left and right sides of the fifth wheel hitch when viewed from the rear of the hitch or vehicle in which the hitch is installed).

In one embodiment, the fifth wheel hitch of the present disclosure comprises a fifth wheel hitch having a latching system that restricts the movement of the fifth wheel hitch in at least two planes of motion, where the fifth wheel latching system comprises at least two arced latching members on either side of the fifth wheel hitch (i.e., the left and right sides of the fifth wheel hitch when viewed from the rear of the hitch or vehicle in which the hitch is installed).

Turning to a first embodiment of a fifth wheel hitch as described in U.S. Pat. No. 9,511,804, the full disclosure of which is hereby incorporated by reference in its entirety herein, a suitable fifth wheel hitch for incorporation of a latching system in accordance with the present disclosure is described with reference to FIGS. 1 through 16.

Figure 2:
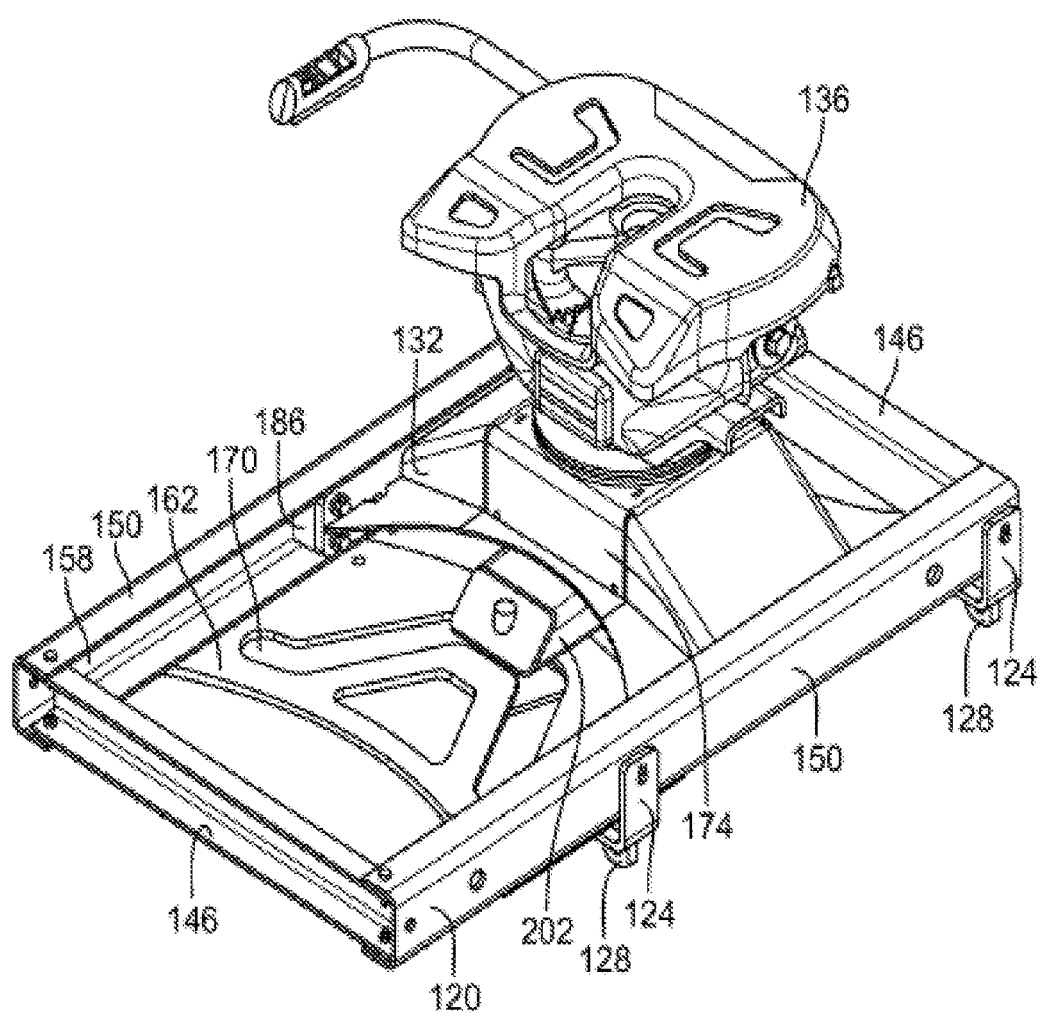
FIG. 2 is a perspective view of the automatic rolling fifth wheel hitch.
Figure 3:
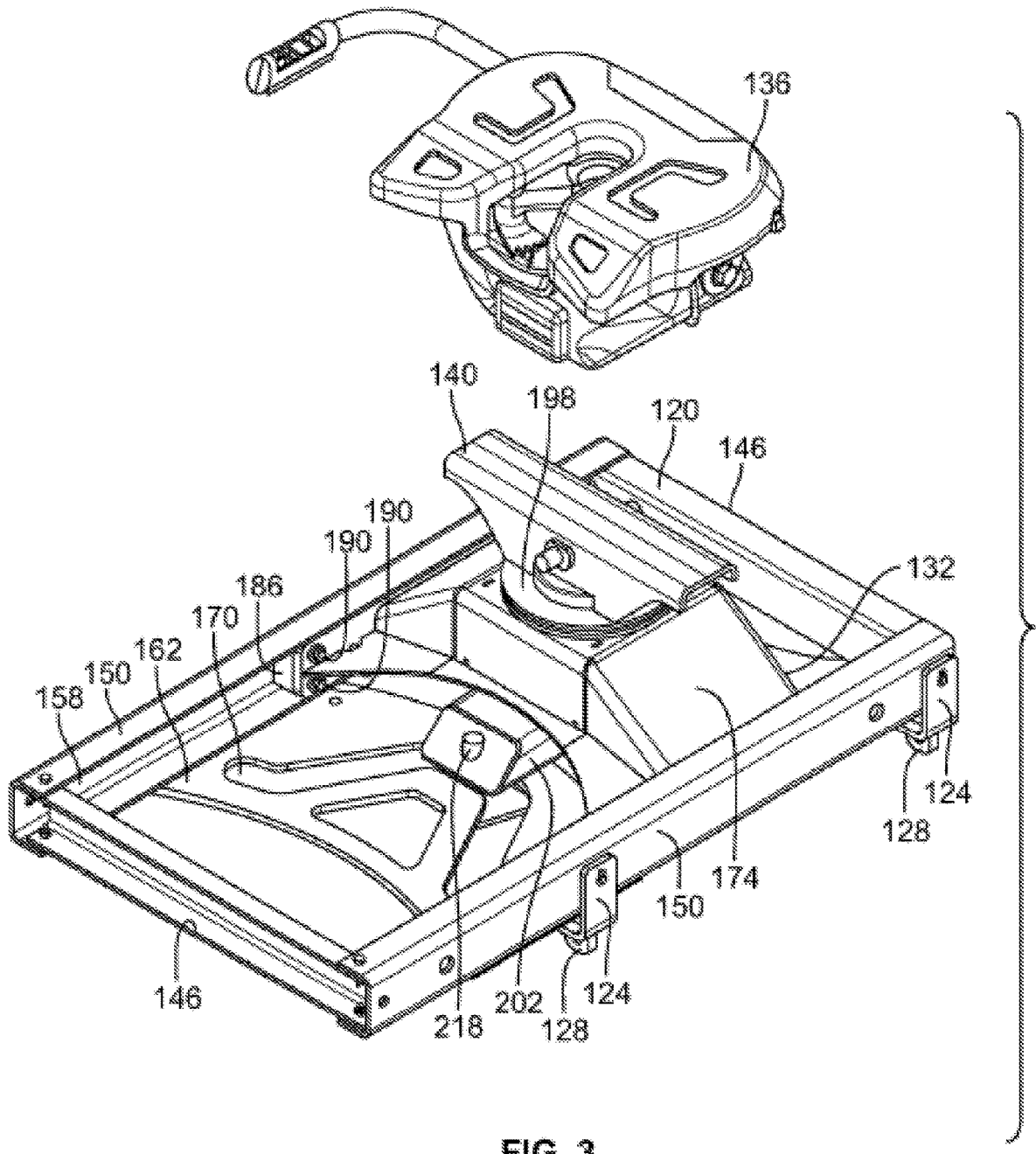
FIG. 3 is a partially exploded perspective view of the automatic rolling fifth wheel hitch.

Turning to FIGS. 1 through 3, an automatic rolling fifth wheel hitch 100 is shown therein. The automatic rolling fifth wheel hitch 100 may attach to a load bed 104 of a towing vehicle 108 in any appropriate manner. By way of a non-limiting example, a pair of rail members 112 may be selectively attached to the load bed 104 in any appropriate manner, including, without limitation utilizing fasteners, securement devices or the like. The rail members 112 may extend transversely across the load bed 104 as shown in FIG. 1. The rail members 112 may be configured to attach a standard fifth wheel hitch as well as the automatic rolling fifth wheel hitch 100 or may be specifically configured for the automatic rolling fifth wheel hitch 100. The automatic rolling fifth wheel hitch 100 may be selectively attached to the rail members 112 in any appropriate manner; such as by way of a non-limiting example via fasteners (not shown). Any appropriate configuration of fasteners may be used—the present teachings are not limited to a specific configuration of fasteners.

The automatic rolling fifth wheel hitch 100 may include a base frame 120 selectively secured to the rail members 112. The base frame 120 may include at least one bracket 124, including, without limitation two pairs of brackets 124 attached thereto. The brackets 124 may attach with the rail members 112 through the use of fasteners (not shown). Specifically, each of the brackets 124 may include a leg 128 attached thereto in any appropriate manner, including, without limitation being integrally formed therewith. The legs 128 may be insertable into the rail members 112. Fasteners may then be inserted into and through the legs 128 and rail members 112 selectively securing the automatic rolling fifth wheel hitch 100 with the rail members 112 and the load bed 104 of the towing vehicle 108. This arrangement may make it easy to remove the automatic rolling fifth wheel hitch 100 when not needed.

The automatic rolling fifth wheel hitch 100 may include a trolley 132 operatively engaged with the base frame 120 as described in more detail below. The automatic rolling fifth wheel hitch 100 may further include a fifth wheel head 136 pivotally attached with the trolley 132. The fifth wheel head 136 may be of any appropriate configuration such that a king pin of a towed vehicle may operatively engage with the fifth wheel head 136 resulting in the towing vehicle 108 being capable of towing the towed vehicle. By way of a non-limiting example, the fifth wheel head 136 may be of a configuration as shown and described in any one of: U.S. patent application Ser. No. 13/190,878 (Publication No. 20120018979) entitled "Fifth Wheel Hitch Isolation System," filed Jul. 26, 2011; U.S. patent application Ser. No. 13/190,919 (Publication No. 20120018978) entitled, "Fifth Wheel Hitch Retention System," filed Jul. 26, 2011; and U.S. patent application Ser. No. 13/191,009 (Publication No. 20120018977) entitled "Fifth Wheel Hitch Skid Plate Cover," filed Jul. 26, 2011, all of which are hereby incorporated by reference. Further, the fifth wheel head 136 may be of a configuration as shown and described in all of the applications incorporated by reference immediately above. However, the present teachings are not limited to these disclosed configurations of the fifth wheel head 136. Any appropriate configuration may be used.

As shown in FIG. 3, the fifth wheel head 136 may be pivotally attached with the trolley 132 through use of a pivot shaft 140. The fifth wheel head 136 may be attached with the pivot shaft 140 in any appropriate manner. By way of a non-limiting example, the fifth wheel head 136 may be attached with the pivot shaft 140 through the use of fasteners, welding, or the like. The fifth wheel head 136 attached with the pivot shaft 140 may result in the fifth wheel head 136 being pivotable with respect to the base frame 120. The pivoting of the fifth wheel head 136 may allow the towed vehicle to pivot with respect to the towing vehicle 108 during operation. Therefore, as the towing vehicle 108 turns, the fifth wheel head 136 may pivot independently of the towing vehicle 108. This may permit the towed vehicle to turn more efficiently and effectively.

Figures 5, 6:
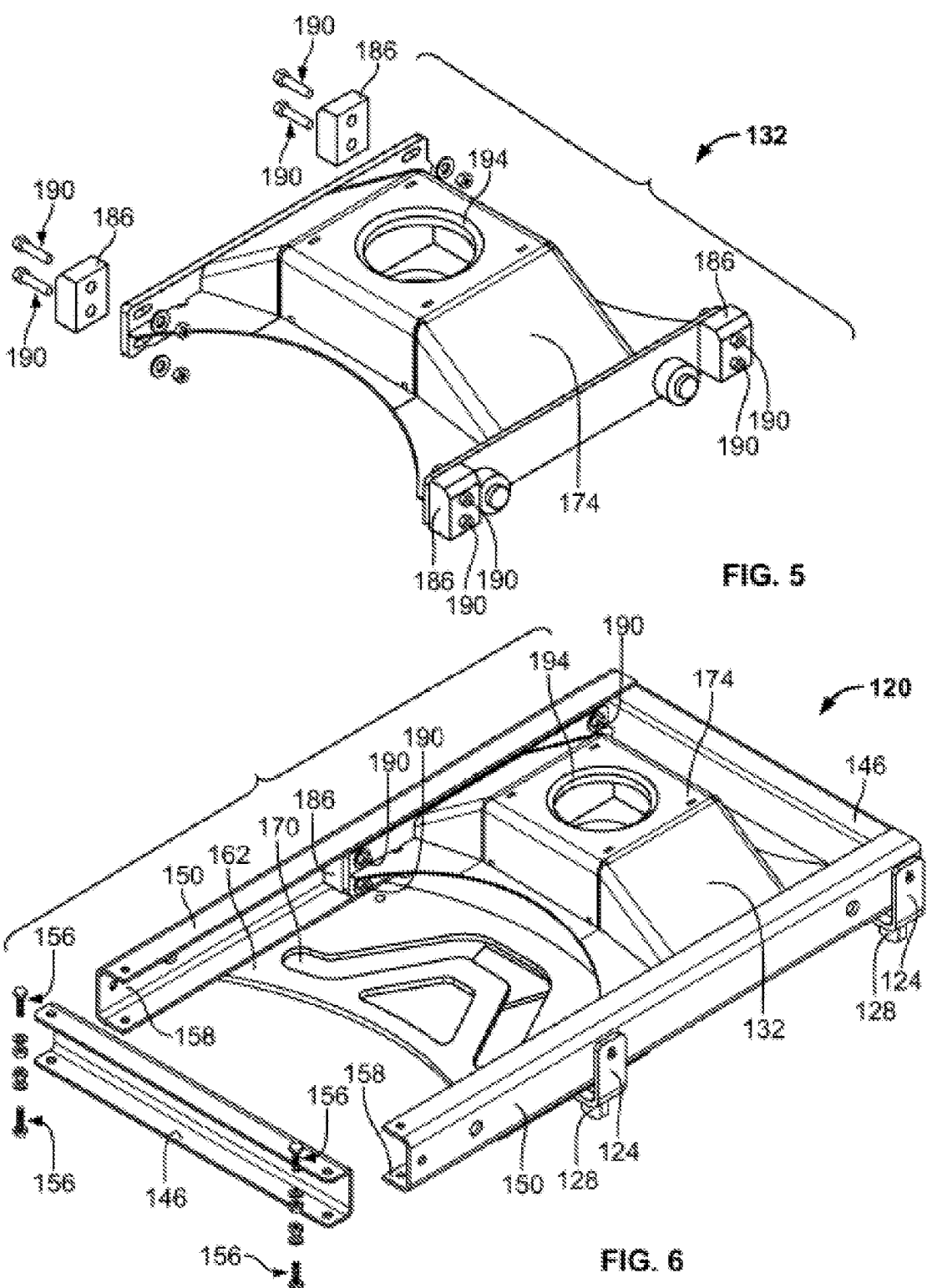
FIG. 5 is a perspective view of a trolley of the automatic rolling fifth wheel hitch.
FIG. 6 is a perspective view of the base frame of the automatic rolling fifth wheel hitch.

As shown in FIG. 6, the base frame 120 may include a pair of end rails 146 and a pair of longitudinally extending rails 150. The rails 146, 150 may be operatively secured together to form the base frame 120. By way of a non-limiting example, fasteners 154 may be utilized to secure the rails 146, 150 together. The present teachings, however, are not limited to the use of fasteners 154. The rails 146, 150 may be attached such as through welding, being monolithically formed together, welded, or otherwise adhered together. The longitudinally extending rails 150 may each have a generally C-shaped cross sectional shape such that they each include a channel 158. The channel 158 may be of a shape and size to permit rolling engagement of the trolley 132 with the base frame 120.

The base frame 120 may further include a cam plate 162 attached to the base frame 120 in any appropriate manner. By way of a non-limiting example, the cam plate 162 may be attached to an underside 166 of the longitudinal rails 150 such as through the use of fasteners, welding or the like. The cam plate 162 may include a cam path 170 formed therein. The cam path 170 may be formed as a monolithic unit with the cam plate 162 or may be formed therein through a subsequent operation.

Figure 8:
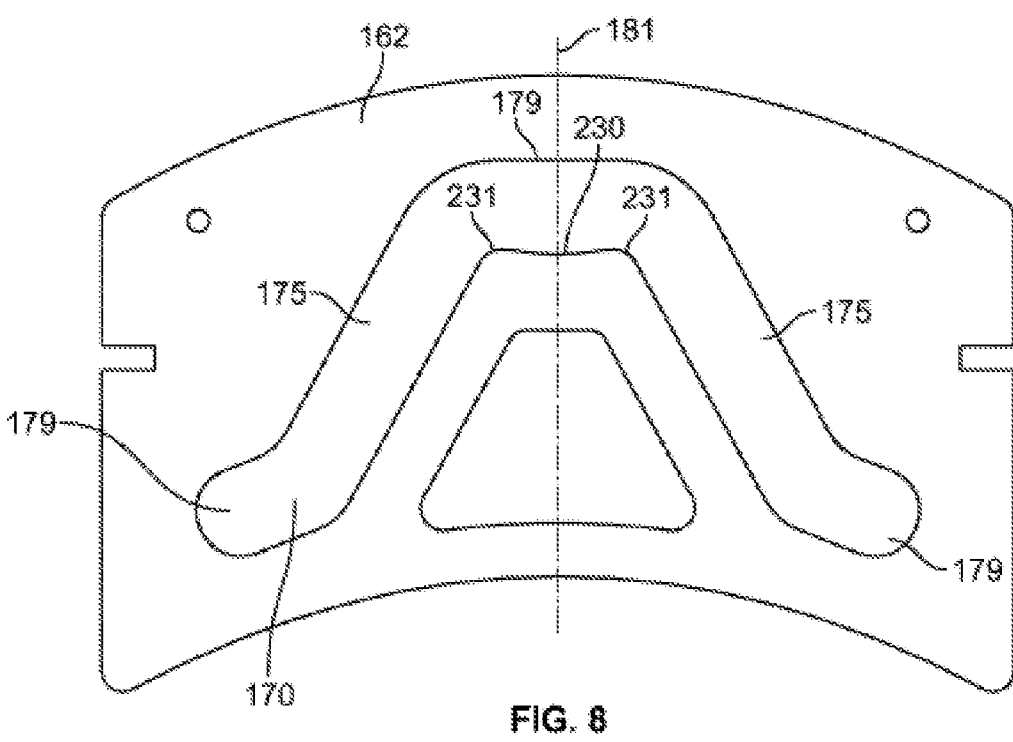
FIG. 8 is a top view of embodiments of a cam plate.
Figure 9:
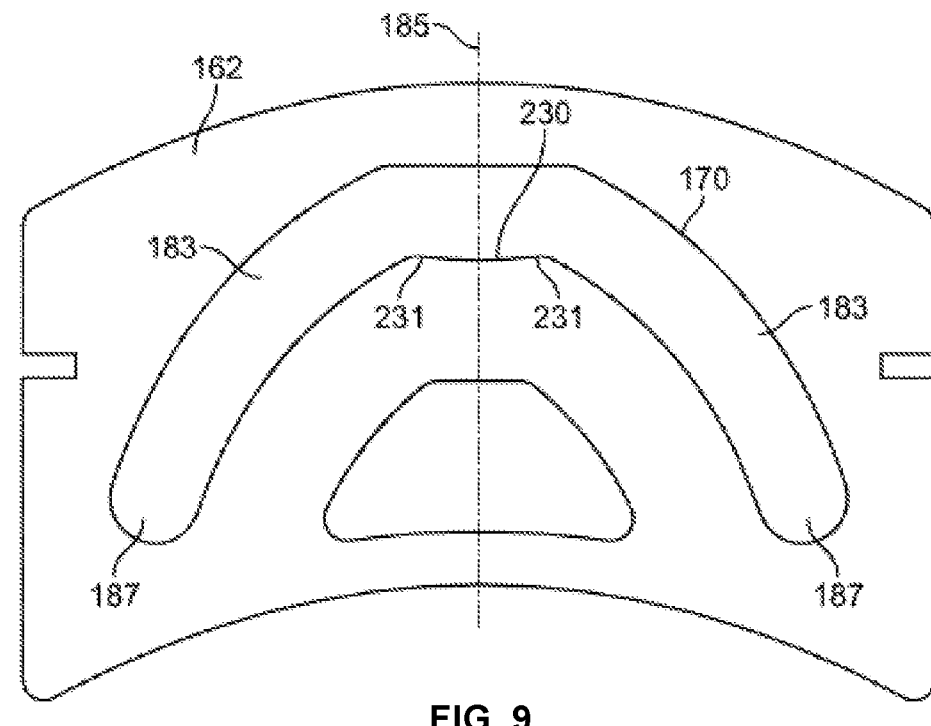
FIG. 9 is a top view of embodiments of a cam plate.
Figure 10:
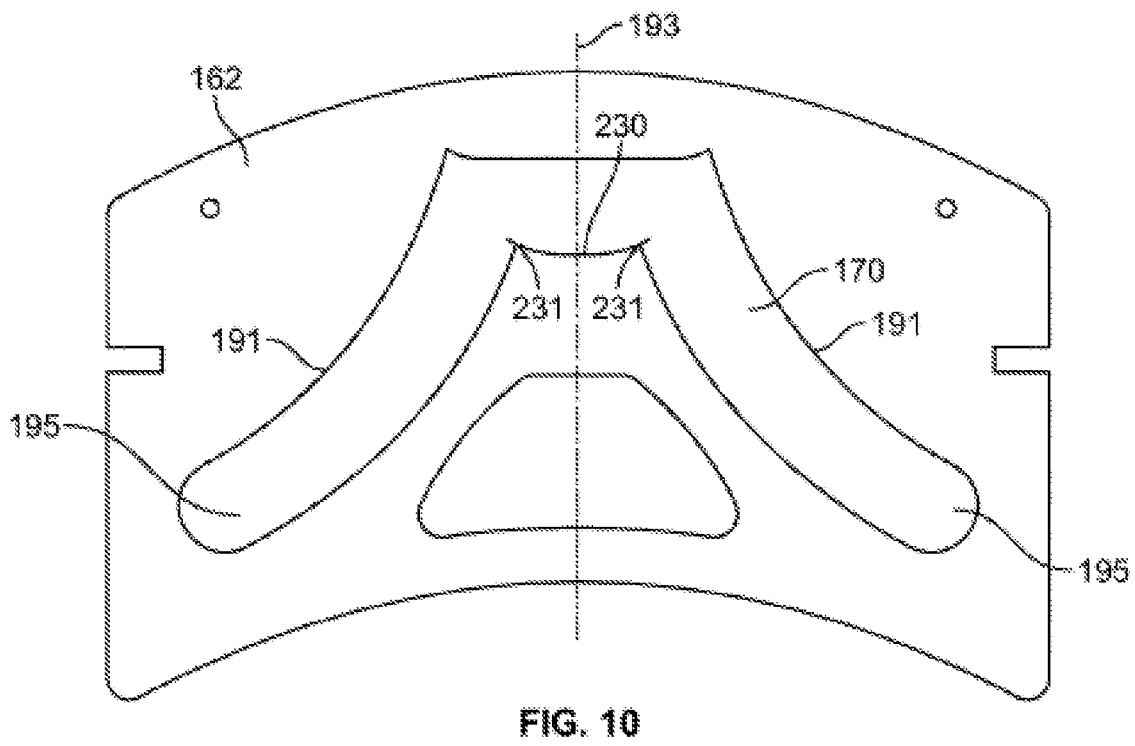
FIG. 10 is a top view of embodiments of a cam plate.

As shown in FIGS. 8, 9 and 10, the cam path 170 may be generally non-linear. The cam path 170 being non-linear may permit the fifth wheel head 136 to move rearward further within the same angular turn between the towed and towing vehicle 108 during operation of the automatic rolling fifth wheel hitch 100. By way of a non-limiting example, the non-linear cam path 170 may be formed from a plurality of linear paths integrated together to form the non-linear cam path 170. The non-linear cam path 170 may also be formed as an arcuate or semi-circular path.

As shown in FIG. 8, the cam path 170 may include two first paths or portions 175 that both extend in a generally angular direction from a center section 177. First portions may be generally symmetrical about centerline 181. The cam path 170 may also include second paths or portions 179 that may extend in a generally angular direction from ends of each first paths 175. These second portions 179 may extend at a different angle than the first portions 175 relative to centerline 181. By way of a non-limiting example, the first portions 175 may extend at a greater angle from a centerline 181 of the cam plate 162 than the second portions 179. In some embodiments, the second portions 179 may also be generally symmetrical one another, but the present teachings are not limited to such. In operation, the second portions 179 may provide a different rate of movement of trolley 132 as the towing vehicle 108 pivots relative to the towed vehicle as explained in more detail below. First and second portions 175, 179 may each be generally linear portions (i.e., each may extend in a generally continuous angular direction relative to centerline 181).

As shown in FIG. 9, the cam path 170 may include two generally arcuate portions 183. The arcuate portions 183 may extend at any appropriate relative angle from the centerline 185. By way of a non-limiting example, the arcuate portions 183 may be in a generally concave shape as shown in FIG. 9. The arcuate portions 183 may be symmetrical relative to one another. As the cam path 170 extends at an arcuately downward angle, end portions 187 of the cam path are at a different relative angle to the centerline 185 than top portions thereof. The curvature of arcuate portions 183 may provide a different rate of movement of trolley 132 as the towing vehicle 108 pivots relative to the towed vehicle as explained in more detail below.

As shown in FIG. 10, cam path 170 may include two generally arcuate portions 191. The arcuate portions 191 may extend at any appropriate relative angle from the centerline 193. By way of a non-limiting example, the arcuate portions 191 may be in a generally convex shape. The arcuate portions 191 may be symmetrical relative to one another. As the cam path 170 extends at an arcuately downward angle, end portions 195 of the cam path are at a different relative angle to the centerline 193 than top portions thereof. The curvature of arcuate portions 183 may provide a different rate of movement of trolley 132 as the towing vehicle 108 pivots relative to the towed vehicle as explained in more detail below.

Figure 4:
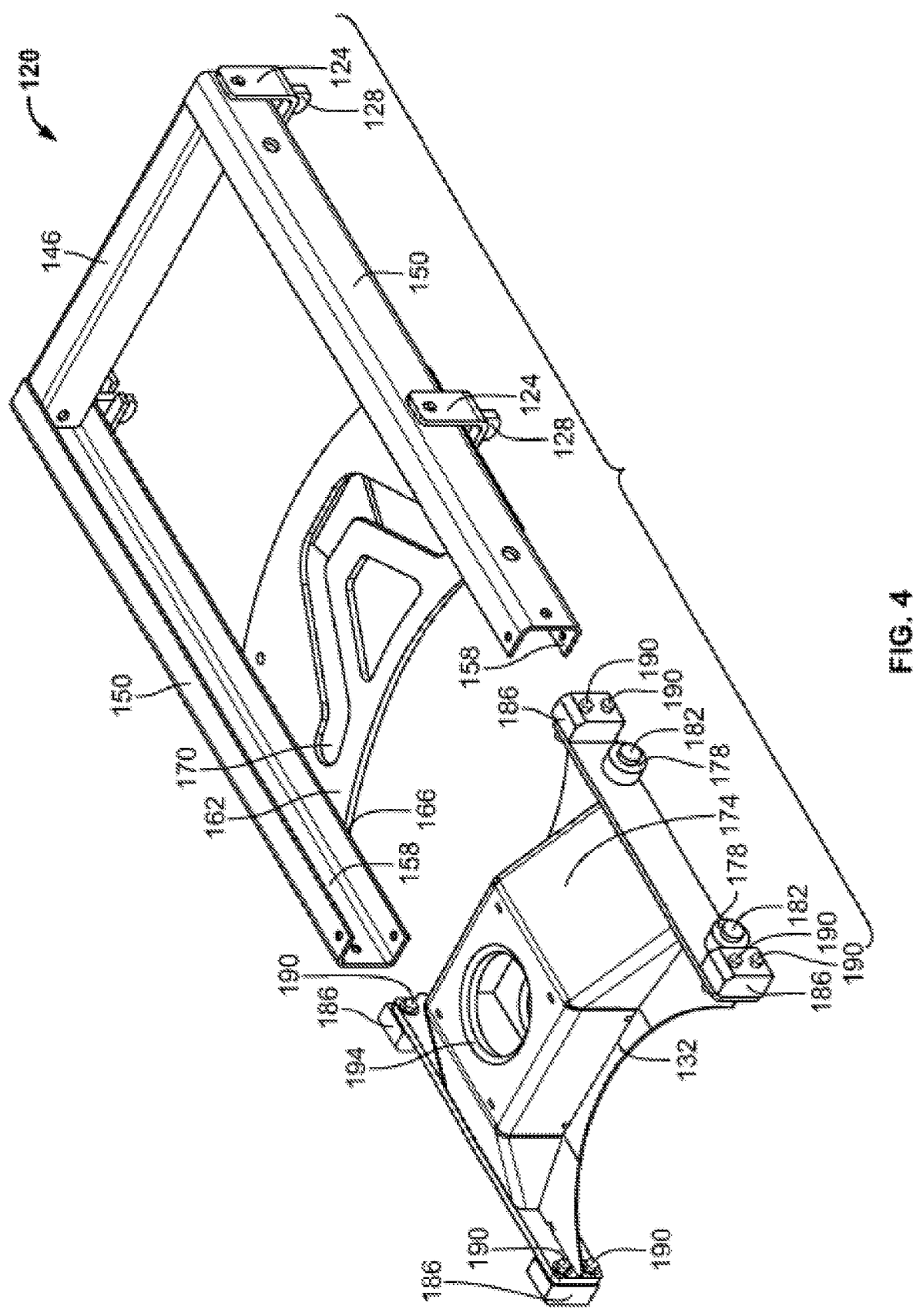
FIG. 4 is a partially exploded view of a base frame and trolley of the automatic rolling fifth wheel hitch.

The trolley 132 may be shaped and sized to generally extend between the longitudinally extending rails 150 and may include a portion of which that extends within the channel 158. More specifically, the trolley 132 may include a body 174 that may be shaped and sized to extend between the longitudinally extending rails 150 of the base frame 120. The trolley 132 may include a plurality of rollers or wheels 178 rotatably attached to the body 174 in any appropriate manner. By way of a non-limiting example, four rollers 178 may be used—although any appropriate number of rollers may be used without departing from the present teachings. As shown in FIG. 4, fasteners 182 may be used to attach the rollers 178 with the body 174. The present teachings, however, are not limited to use of fasteners 182. The rollers 178 may be attached with the body 174 in any appropriate manner.

The rollers 178 may be shaped and sized to operatively roll along the longitudinally extending rails 150, or more specifically along the channels 158 of the longitudinally extending rails 150. The rollers 178 may be formed from a generally rigid material that has an effective coefficient of friction such that the rollers 178 may roll along the channel 158 generally freely. Further, the rollers 178 may be of a material that generally prevents inappropriate wear during use of the automatic rolling fifth wheel hitch 100 and is able to carry the load of the automatic rolling fifth wheel hitch 100 during operation. By way of a non-limiting example, the rollers 178 may be formed from steel, or other metal, polymer, or other plastics, or a hard rubber, or a combination of such materials.

The trolley 132 may also include guide blocks 182. The guide blocks 182 may be attached to the body 174 in any appropriate manner, including, without limitation through use of fasteners 190. By way of a non-limiting example, four such guide blocks 182 may be attached with the body 174. The guide blocks 182 may be attached with the body 174 such that they are generally adjacent the rollers 178, or more specifically extend laterally away from the rollers 178 resulting in the guide blocks 182 being positioned on or near the corners of the trolley 132. The guide blocks 182 may keep a generally tight, operative fit between the trolley 132, or more specifically, the rollers 178 and the channel 158. The guide blocks 182 may control the axially upward and downward movement as well as the fore and aft movement of the trolley 132. The guide blocks 182 may also help control and guide the trolley 132 during operation of the automatic rolling fifth wheel hitch 100. The guide blocks 182 may be formed of any appropriate material, including, without limitation, polymer or other plastics, rubber, or a combination of such materials.

Further, as shown in FIGS. 3, 4, 6 and 7, the channel 158 may be generally enclosed on at least three sides with portions thereof extending downward and upward on a fourth side. This may form a generally C-shaped cross-sectional shape. This shape of the channel 158 may enclose the rollers 178 therein when operatively engaged. This enclosure may permit the automatic fifth wheel hitch 100, or more specifically, the base frame 120 to be positioned generally lower in the load bed 104 of the towing vehicle 108. Prior art systems are typically positioned higher in the load bed. The base frame 120 being lower in the load bed 108 may result in a generally lower center of gravity for the automatic fifth wheel hitch 100. Further, the base frame 120 may be wider than other prior art systems. The wider and lower base frame 120 may allow for a tighter (i.e., more controlled movement) automatic fifth wheel hitch 100. The automatic fifth wheel hitch 100 may provide additional control for an operator and is more efficient than other prior art systems. Further, the automatic fifth wheel hitch 100 may provide a more direct load path, e.g., from top of the fifth wheel head 136 to the rollers 178. The wider and lower base frame 120 may spread the load applied to the fifth wheel head 136 during operation down to the trolley 132 and through to the legs 128 and ultimately to the towing vehicle 108. This may result in a more efficient and effective automatic fifth wheel hitch 100. The operation of which may be smoother and more stable than other prior art systems.

As shown in FIG. 4, once the trolley 132 has been assembled, it may be operatively engaged with the base frame 120. Either one of the end rails 146 may be removed from the base frame 120 or not otherwise attached thereto. This may provide access between the trolley 132 and the channel 158, or more specifically, the channel 158 and the rollers 178 of the trolley 132. The trolley 132 may be rolled onto the base frame 120 such that the rollers 178 may freely roll within the channel 158. This may result in the trolley 132 being capable of rolling freely within the base frame 120 generally between the end rails 146 during operation of the automatic rolling fifth wheel hitch 100 as described in more detail below.

The body 174 of the trolley 132 may include an aperture 194. The aperture 194 may be shaped and sized such that the pivot shaft 140 may be inserted within the body 174. The pivot shaft 140 may be inserted into the aperture 194 so that it is pivotally attached with the body 174. In such embodiments, a protective ring 198 may be generally aligned with the aperture 194 and as the pivot shaft 140 is inserted into the aperture 194, the protective ring 198 may be positioned between the pivot shaft 140 and the body 174. The protective ring 198 may be made of any appropriate material, including, without limitation a sacrificial material. Further, by way of non-limiting examples, the material may include elastomer, plastic, rubber, or any combination of such. The protective ring 198 being positioned between the body 174 and pivot shaft 140 may generally protect either or both of the pivot shaft 140 and body 174 during operation of the automatic rolling fifth wheel hitch 100. Additionally, the protective ring 198 may act as a lubricant or friction reduction surface during operation of the automatic rolling fifth wheel hitch 100.

Figure 7:
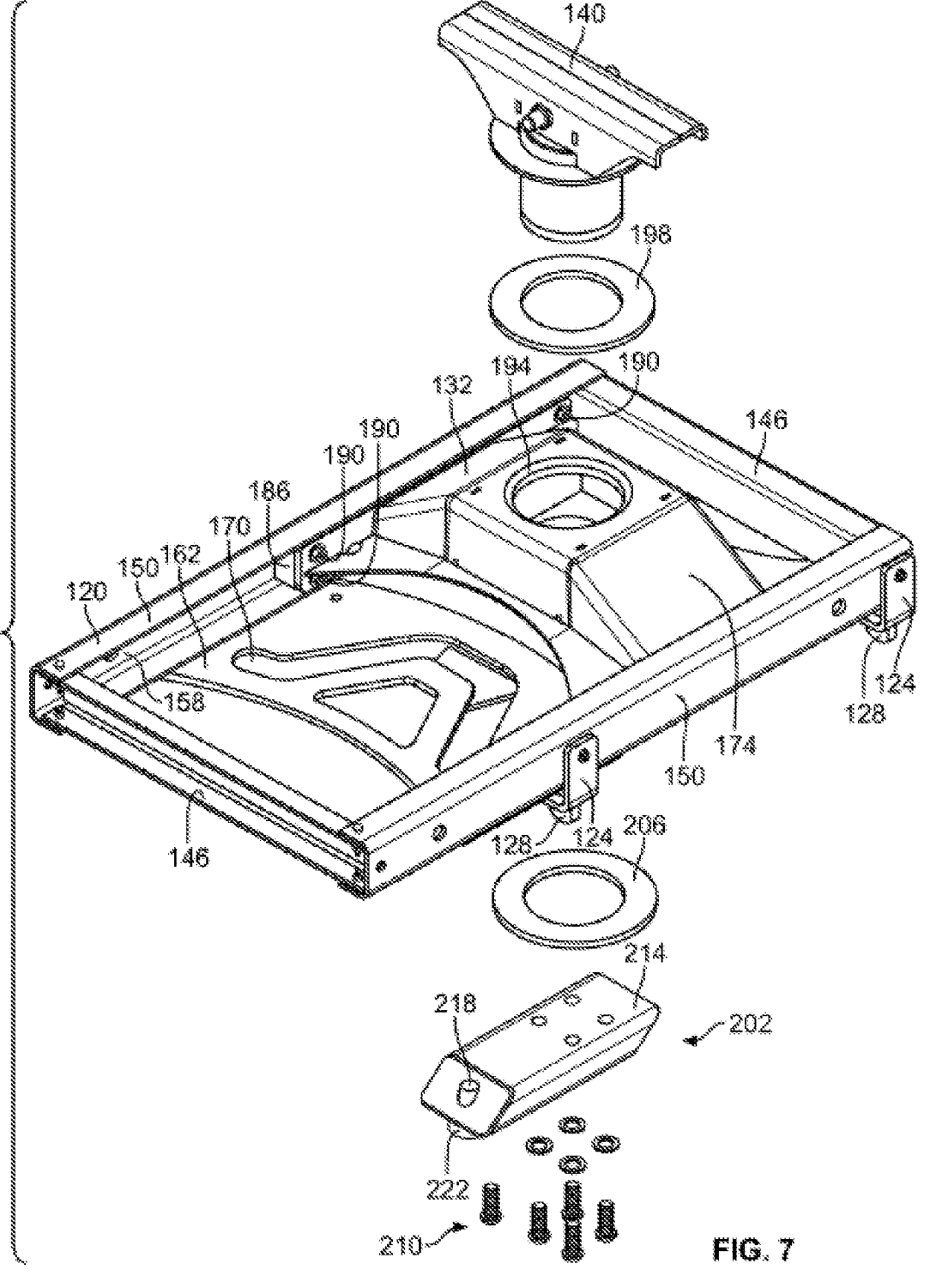
FIG. 7 is a partially exploded view of a portion of the automatic rolling fifth wheel hitch.

As shown in FIG. 7, a cam follower 202 may be operatively attached with the trolley 132. In such embodiments, a cam follower protective ring 206 may be generally positioned between the cam follower 202 and the body 174 of the trolley 132. The protective ring 206 may be made of any appropriate material, including, without limitation a sacrificial material. Further, by way of non-limiting examples, the material may include elastomer, plastic, rubber, or any combination of such. The protective ring 206 may generally protect either or both of the cam follower 202 and body 174 during operation of the automatic rolling fifth wheel hitch 100 (i.e., the rotating of cam follower 202 relative to body 174). Additionally, the protective ring 206 may act as a lubricant or friction reduction surface during operation of the automatic rolling fifth wheel hitch 100. The cam follower 202 may be attached with the trolley 132 in any appropriate manner. By way of a non-limiting example, the cam follower 202 may attach with the trolley 132 by a plurality of fasteners 210. Specifically, the fasteners 210 may operatively secure the cam follower 206 with the pivot shaft 140. The fasteners 210 may be inserted into and connected with the trolley 132.

The cam follower 202 may include a body portion 214 and a cam portion 218. The body portion 214 may be attached with the pivot shaft 140 when it is inserted into and connected with the body 174 of the trolley 132. Therefore, as the pivot shaft 140 pivots, the cam follower 202 or more specifically, the body portion 214 may pivot. The cam portion 218 may include a contact member 222 that may be shaped and sized to operatively fit within and engage the cam path 170. The contact member 222 may follow the cam path 170 during operation of the automatic fifth wheel hitch 100 and may be generally retained within the cam path 170. In this manner, cam follower 202 is engaged with and follows cam path 170 during operation of automatic fifth wheel hitch 100.

In some embodiments, the automatic rolling fifth wheel hitch 100 may include a cover 226 attached with the base frame 120. The cover 226 may generally encapsulates the base frame 120, trolley 132 and the cam plate 162. More specifically, the cover 226 may generally encapsulate or circumscribe the working components of the automatic rolling fifth wheel hitch 100. The cover 226 may provide an aesthetically pleasing finish for the automatic rolling fifth wheel hitch 100. The cover 226 may also generally protect the working components of the automatic rolling fifth wheel hitch 100 from the elements, which may extend the life thereof and may generally protect operative engagement between the rollers 178 and the channel 158.

In operation, the automatic fifth wheel hitch 100 may be attached to the load bed 104 of the towing vehicle 108 as described above. A king pin (not shown) of a towed vehicle (not shown) may be operatively secured with the fifth wheel head 136 in any appropriate manner. Once operatively attached, the towing vehicle 108 may be operated. At this point any relative rotation between the towed vehicle and the fifth wheel head 136 may be inhibited by a detent section in the cam path as described below. The towed vehicle may then be towed in the normal manner by the towing vehicle 108. When the towing vehicle 108 and the towed vehicle encounter a turn in the road, the towed vehicle may pivot relative the towing vehicle 108. More specifically, under such conditions the towed vehicle may pivot relative to the trolley 134 about a vertical axis A that generally coincides with the fifth wheel head 136 and as shown in FIG. 1.

When the towed vehicle pivots relative to the towing vehicle 108, the fifth wheel head 136, pivot shaft 140 and cam follower 202 may pivot relative to the towing vehicle 108. The fifth wheel head 136, pivot shaft 140 and cam follower 202 may all be fixedly secured with one another such that they may pivot in unison. The trolley 132, however, will not pivot with respect to the load bed 104 of the towing vehicle 108. The cam path 170 may include a detent section 230, such as that shown in FIGS. 8, 9 and 10 generally in proximity to the fore and aft centerline 181, 185 and 193, respectively of the cam plate 162. The detent 230 may form a normal operating position for the cam follower 202. When the towing vehicle 108 is in a normal driving operation, e.g., when driving generally straight and aligned with the towed vehicle, the cam follower 202 or more specifically the contact member 222 may be engaged in the detent 230, i.e., it may generally be positioned in the detent 230. The detent 230 may be curved. Detent 230 may have end portions 231 that generally maintain cam follower 202 engaged in detent 230 during normal driving operation and inhibit the contact member 222 and cam follower 202 from moving along the cam path 170 outside of detent 230. However, when the fifth wheel head 136, pivot shaft 140 and cam follower 202 may be caused to pivot, such as by the turning of towing vehicle 108 a sufficient amount relative to the towed vehicle, the cam follower 202 may move out from the detent 230 past end portions 231 and travel further along cam path 170. The distance cam follower 202 moves along cam path 170 may be related to the degree of relative pivoting between the towing vehicle 108 and the towed vehicle (i.e., the degree of relative rotation between the fifth wheel head 136 and body 174).

The cam follower 202 being released from the detent 230 may generally allow the trolley 132 to roll towards a rear portion 234 of the towing vehicle 108 as the pivot angle between the towing vehicle and the towed vehicle changes. The momentum of the trolley 132 resulting from turning of the towing vehicle 108 may allow the rollers 178 to roll along the channel 158. This momentum may continue to roll the trolley toward the rear portion 234 of the towing vehicle 108 until at least one of the guide blocks 182 engages with the end rail 146 closest to the rear portion 234 of the towing vehicle 108. As the trolley 132 rolls toward the rear portion 234 of the towing vehicle 108, the cam follower 202 may continue to move along the cam path 170 toward the rear portion 234 of the towing vehicle 108. This may result in the fifth wheel head 136 traveling in conjunction with the trolley 132 rearward toward the rear portion 234 of the towing vehicle 108. This rearward movement of the fifth wheel head 136 may generally create additional space between a cab 238 of the towing vehicle 108 and the towed vehicle. This additional space may thereby provide sufficient room for the towed vehicle to pivot with respect to the towing vehicle 108 without interference.

Figure 11:
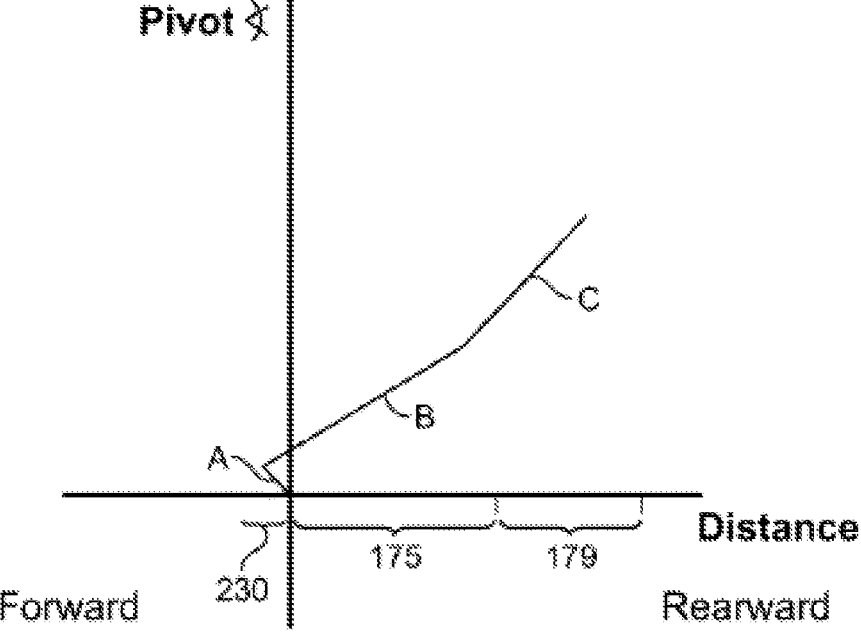
FIG. 11 is a graphical representation of change of angle versus travel distance for a cam path of the cam plate of FIG. 8.
Figure 12:
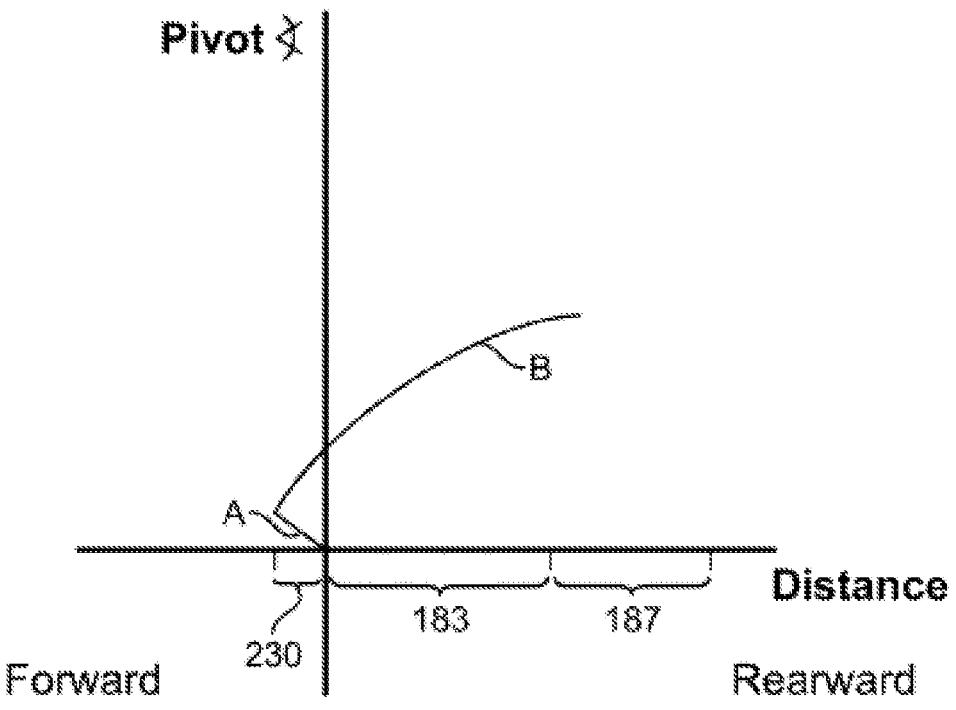
FIG. 12 is a graphical representation of change of angle versus travel distance for a cam path of the cam plate of FIG. 9.
Figure 13:
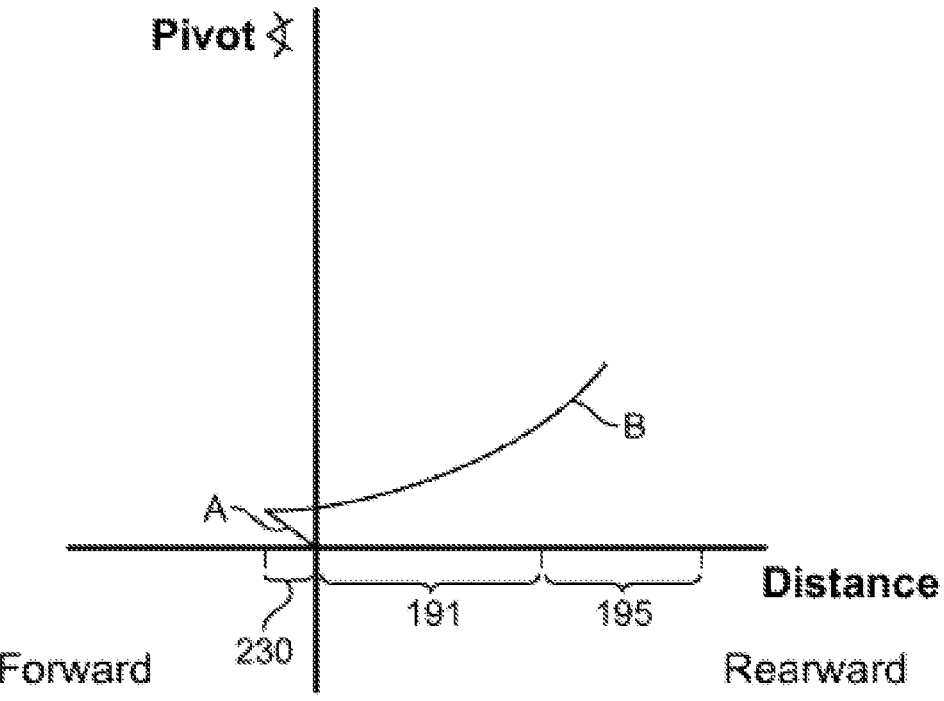
FIG. 13 is a graphical representation of change of angle versus travel distance for a cam path of the cam plate of FIG. 10.

For the cam plate 162 of FIG. 8, once the cam follower 202 releases from the detent 230, the cam follower 202 will follow along either of the generally symmetrical first portions 175. The shape and configuration of cam path 170 may determine the rate and distance that trolley 132 moves in response to relative rotation between the towing vehicle 108 and the towed vehicle. This relation may result in the towed vehicle moving backward at greater distance and/or at a greater rate than the prior art systems. The different configurations of the first and second portions 175, 179 may result in the trolley 132 moving at a different rate and/or distance in response to relative rotation between the towing vehicle 108 and the towed vehicle. That is, when the cam follower 202 moves from first portion 175 into second portion 179 (and vice versa), the relation between the rate of movement and/or the distance moved of trolley 132 with respect to the change of the pivot angle between the towed vehicle and towing vehicle 108 changes. In the configuration shown in FIG. 8, the rate of movement and the distance moved by trolley 132 as a function of the change in the pivot angle is less in second portion 179 than in first portion 175. This configuration of the cam path 170 may allow the towed vehicle to move away from the cab 238 at a greater rate, resulting in a greater distance between the cab 238 and the towed vehicle during the initial phase of relative rotation between the towing vehicle 108 and the towed vehicle. Depending on the shape of detent section 230 and end portions 231, the towed vehicle may experience an initial forward movement relative to the towing vehicle 108 as cam follower 202 moves out of the detent section 230. The movement of the trolley 132 as a function of the change in the pivot angle is represented in the graph of FIG. 11. As shown, the trolley may undergo a first motion A as cam follower 202 moves out of detent section 230, a second motion B as cam follower 202 moves along first portion 175, and a third motion C as cam follower 202 moves along second portion 179.

For the cam plate 162 of FIG. 9, once the cam follower 202 releases from the detent 230, the cam follower 202 will follow along either of the generally arcuate portions 183. The shape and configuration of cam path 170 may determine the rate and distance that trolley 132 moves in response to relative rotation between the towing vehicle 108 and the towed vehicle. This relation may result in the towed vehicle moving backward at greater distance and/or at a greater rate than the prior art systems. The arcuate configuration of path 183 may result in a continuously varying rate of movement and distance traveled by trolley 132 as a function of the change in the pivot angle. The movement of the trolley 132 as a function of the change in the pivot angle as cam follower 202 moves along arcuate path 183 may be represented by the graph of FIG. 12. As shown, trolley 132 may undergo a first motion A as cam follower 202 moves out of detent section 230 and a second motion B as cam follower 202 moves along arcuate portion 183. As can be seen in second motion B, trolley 132 moves a shorter distance and at a slower rate as the pivot angle increases. That is, as the cam follower 202 moves along the arcuate path 183 toward the end portion 187, the relation between the distance traveled and the rate of travel in response to a change of the pivot angle changes.

For the cam plate 162 of FIG. 10, once the cam follower 202 releases from the detent 230, the cam follower 202 will follow along either of the generally arcuate portions 191. The shape and configuration of cam path 170 may determine the rate and distance that trolley 132 moves in response to relative rotation between the towing vehicle 108 and the towed vehicle. This relation may result in the towed vehicle moving backward at greater distance and/or at a greater rate than the prior art systems. The arcuate configuration of path 191 may result in a continuously varying rate of movement and distance traveled by trolley 132 as a function of the change in the pivot angle. The movement of the trolley 132 as a function of the change in the pivot angle as cam follower 202 moves along arcuate path 191 may be represented by the graph of FIG. 13. As shown, trolley 132 may undergo a first motion A as cam follower 202 moves out of detent section 230 and a second motion B as cam follower 202 moves along arcuate portion 191. As can be seen in second motion B, trolley 132 moves a greater distance and at a greater rate as the pivot angle increases. That is, as the cam follower 202 moves along the arcuate path 191 toward the end portion 1195, the relation between the distance traveled and the rate of travel in response to a change of the pivot angle changes.

As the towing vehicle 108 straightens out and returns from a turning position to a straight ahead position (aligned with the towed vehicle) the change in the pivot angle will move cam follower 202 forward along the cam path 170 toward detent 230. The fifth wheel head 136, pivot shaft 140 and cam follower 202 will all pivot back towards a straightened position and trolley 132 will move forward. Once the towing vehicle 108 straightens out a sufficient distance, the cam follower 202 may engage the detent 230 of the cam plate 162.

Additional embodiments of an automatic rolling fifth wheel hitch according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired automatic rolling fifth wheel hitch without departing from the spirit and scope of the present teachings.

Figure 14:
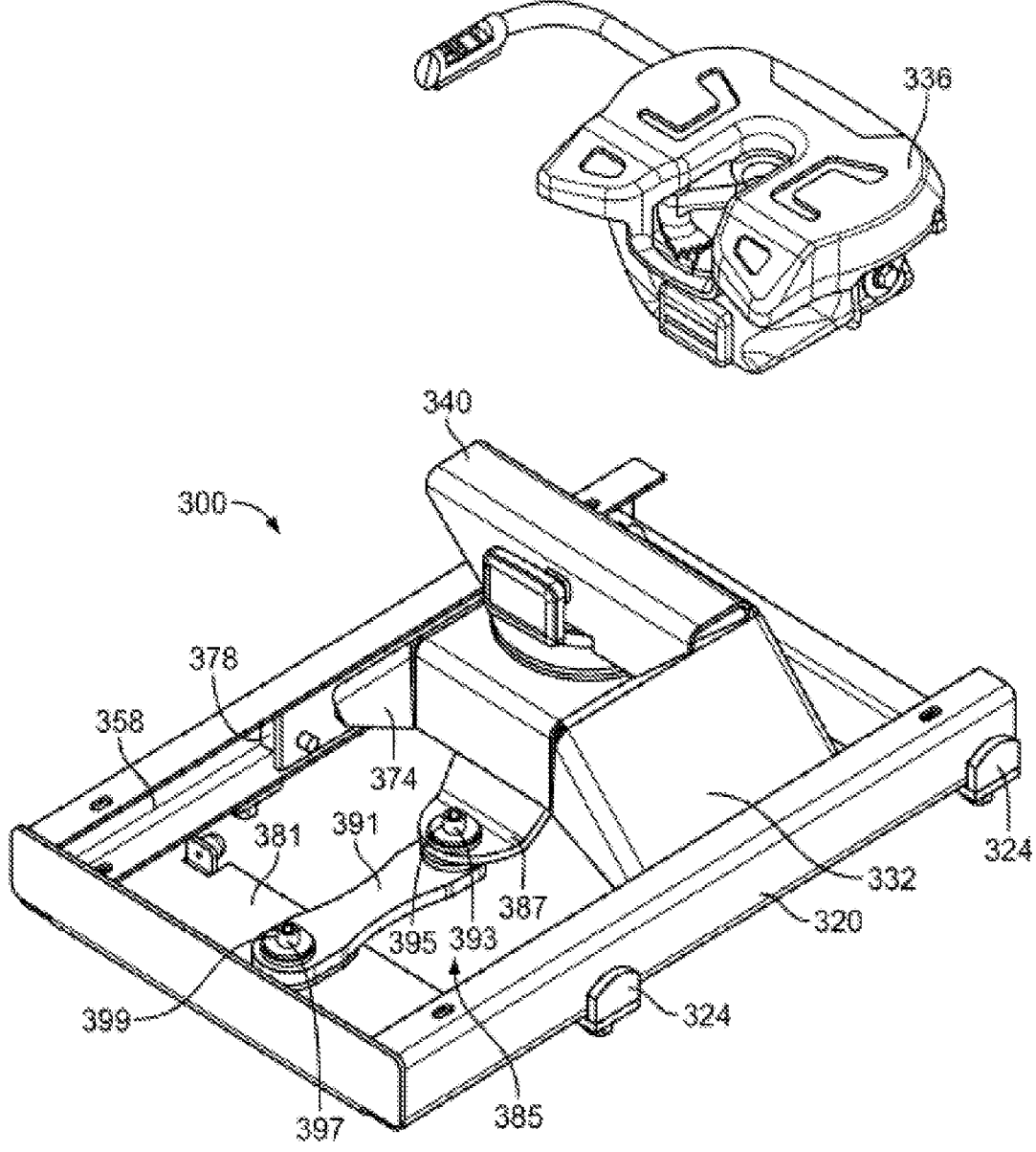
FIG. 14 is a perspective view of embodiments of an automatic rolling fifth wheel hitch.
Figure 15:
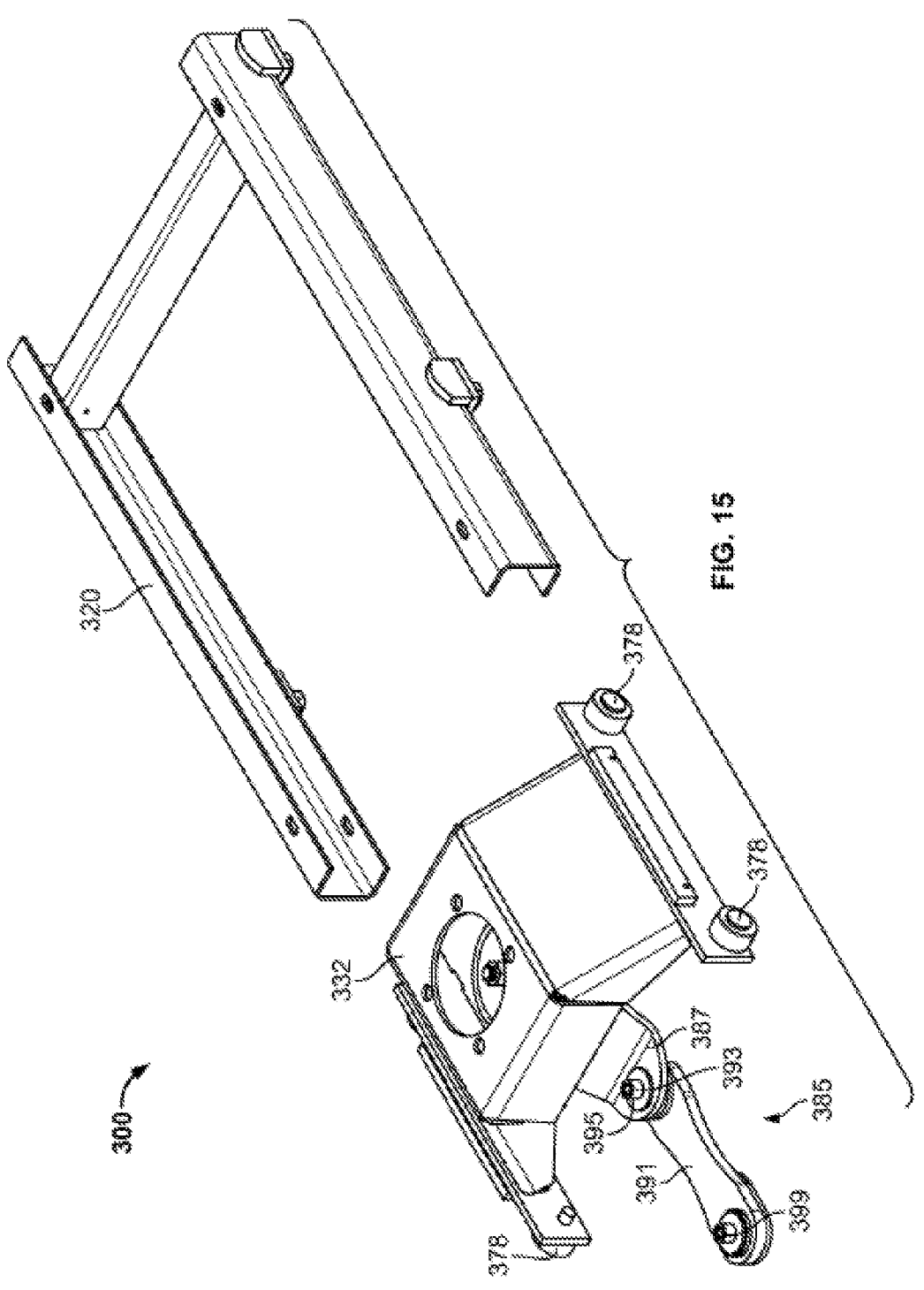
FIG. 15 is a partially exploded view of a base frame and trolley of the automatic rolling fifth wheel hitch.
Figure 16:
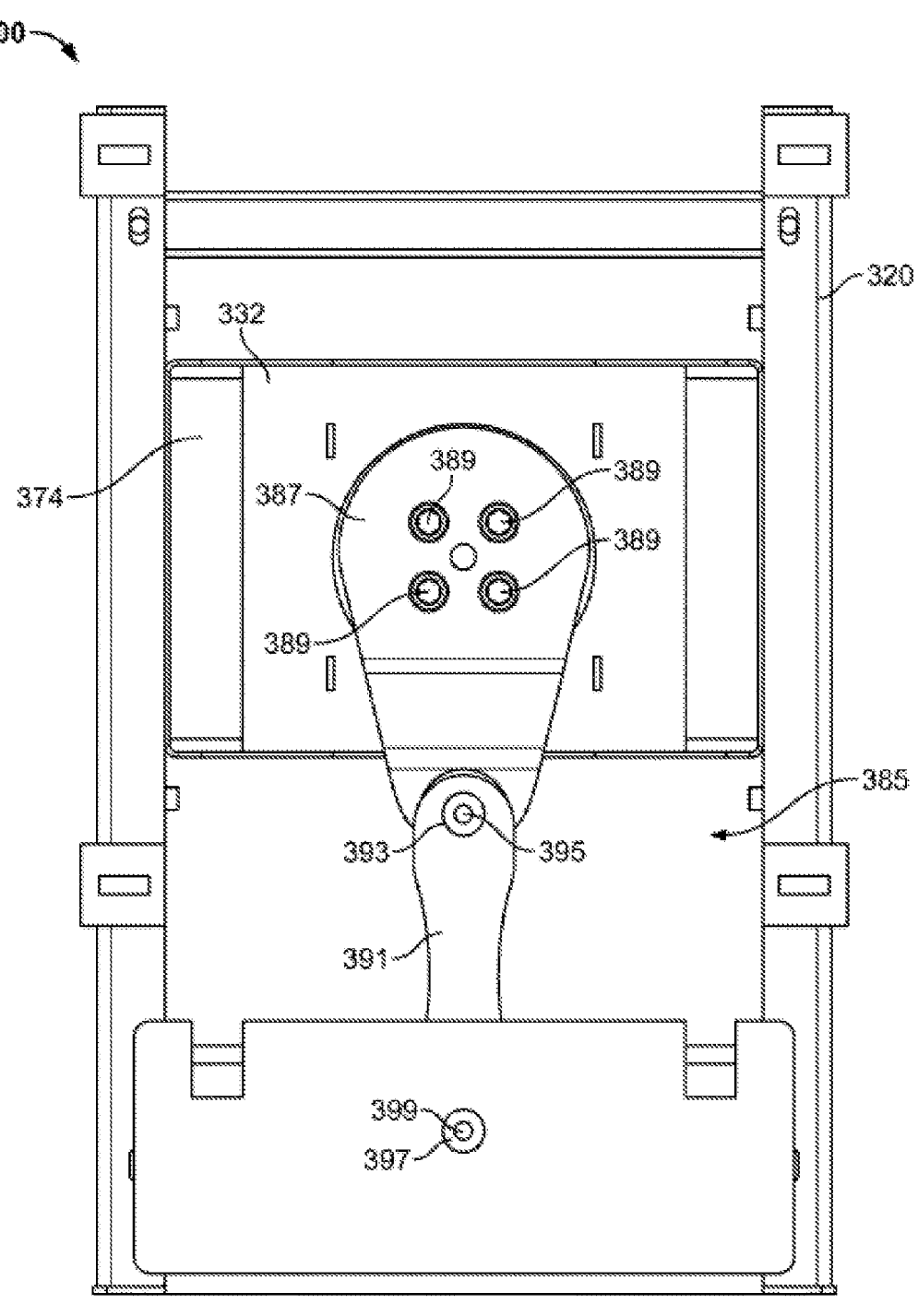
FIG. 16 is a bottom view of the automatic rolling fifth wheel hitch of FIG. 14.

An automatic rolling fifth wheel hitch 300 is shown in FIGS. 14 through 16. The automatic rolling fifth wheel hitch 300 may attach to a load bed 104 of a towing vehicle 108 in any appropriate manner. The automatic rolling fifth wheel hitch 300 may include a base frame 320 selectively secured to the rail members 112. The base frame 320 may include at least one bracket 324, including, without limitation two pairs of brackets 324 attached thereto. The brackets 324 may attach with the rail members 112 through the use of fasteners (not shown).

The automatic rolling fifth wheel hitch 300 may include a trolley 332 operatively engaged with the base frame 320 as described in more detail below. The automatic rolling fifth wheel hitch 300 may further include a fifth wheel head 336 pivotally attached with the trolley 332. The fifth wheel head 336 may be of any appropriate configuration such that a king pin of a towed vehicle may operatively engage with the fifth wheel head 336 resulting in the towing vehicle 108 being capable of towing the towed vehicle.

The fifth wheel head 336 may be pivotally attached with the trolley 332 through use of a pivot shaft 340. The fifth wheel head 336 may be attached with the pivot shaft 340 in any appropriate manner. By way of a non-limiting example, the fifth wheel head 336 may be attached with the pivot shaft 340 through the use of fasteners, welding, or the like. The fifth wheel head 336 attached with the pivot shaft 340 may result in the fifth wheel head 336 being pivotable with respect to the base frame 320. The pivoting of the fifth wheel head 336 may allow the towed vehicle to pivot with respect to the towing vehicle 108 during operation. Therefore, as the towing vehicle 108 turns, the fifth wheel head 336 may pivot independently of the towing vehicle 108. This may permit the towed vehicle to turn more efficiently and effectively.

The trolley 332 may be shaped and sized to generally extend with the base frame 320 and may include a portion of which that extends within a channel 358 of the base frame 320. More specifically, the trolley 332 may include a body 374 that may be shaped and sized to extend between the base frame 320. The trolley 332 may include a plurality of rollers or wheels 378 rotatably attached to the body 374 in any appropriate manner. By way of a non-limiting example, four rollers 378 may be used—although any appropriate number of rollers may be used without departing from the present teachings.

The rollers 378 may be shaped and sized to operatively roll along the channels 358 of the base frame 320. The rollers 378 may be formed from a generally rigid material that has an effective coefficient of friction such that the rollers 378 may roll along the channel 358 generally freely. Further, the rollers 378 may be of a material that generally prevents inappropriate wear during use of the automatic rolling fifth wheel hitch 300 and is able to carry the load of the automatic rolling fifth wheel hitch 300 during operation.

The automatic rolling firth wheel hitch 300 may include a plate member 381 attached with the base frame 320 in any appropriate manner, including, without limitation through welding, fastening or the like. Further, a linkage 385 may be operatively secured with the fifth wheel head 336 through the pivot shaft 340 and the plate member 381. As shown in FIGS. 14 and 15, the linkage 385 may include a first arm 387 fixedly attached with the pivot shaft 340 and fifth wheel head 336. By way of a non-limiting example, the first arm 387 may be fixedly attached with the pivot shaft 340 such as through the use of a plurality of fasteners 389. The first arm 387, however, may be fixedly attached with the pivot shaft 340 and fifth wheel head 336 in any appropriate manner and is not limited to the fasteners 389 shown. First arm 387 may act as a bell crank.

The linkage 385 may further include a second arm 391. The second arm 391 may be pivotally attached between the first arm 387 and the plate member 381. By way of a non-limiting example, the second arm 391 may be pivotally attached with the first arm 387 at pivot 393, such as through use of a fastener 395. Any appropriate fastener 395 may be used without departing from the present teachings. The second arm 391 may also be pivotally attached with the plate member 381 at a second pivot 397, such as through use of a fastener 399. Any appropriate fastener 397 may be used without departing from the present teachings. In some embodiments, the fastener 395 may be substantially similar to the fastener 399 or they may be different.

In operation, when the towing and towed vehicles are generally aligned, the first and second arms 389, 391 of the linkage 385 may remain generally aligned. As the towing vehicle pivots with respect to the towed vehicle, the fifth wheel head 336 may pivot, which may pivot the pivot shaft 340 and the first arm 387. As the first arm 387 pivots, this may cause the first arm 387 and second arm to pivot at pivot point 393. The pivoting of the linkage 385, or more specifically, the first arm 387 relative to the second arm 391, may cause the trolley 332 to be displaced rearward toward the rear of the towing vehicle, i.e., the momentum causes the rearward movement of the trolley 332. Further, the second arm 391 may pivot with respect to the plate member 381 at pivot 397. This motion of the trolley 332 may move the attachment point of the towed vehicle with the towing vehicle rearward. This may create a greater clearance between the towed vehicle and towing vehicle. Specifically, it may create more space between the cab of the towing vehicle and the towed vehicle.

Once the towing and towed vehicles have completed the turn and begin to straighten, the momentum of such may force the trolley 332 forward. This may cause the linkage 385 to straighten, i.e., the first arm 387 and second arm pivot 391 until they are generally aligned. This may move the towed vehicle in closer proximity to the towing vehicle's cab returning the automatic rolling fifth wheel hitch 300 to its normal operating position.

Additionally, as would be apparent to those of skill in the art, the latching system of the present disclosure can be utilized in connection with any number of fifth wheel hitch designs including, but not limited to, those disclosed in U.S. Pat. No. 9,849,738 (the complete disclosure of which is hereby incorporated herein by reference in its entirety), as well as any other fifth wheel hitch that utilizes at least one frame and/or set of rails that permits both mounting of a fifth wheel hitch into a desired vehicle and motion/movement of the fifth wheel hitch in at least one plane of motion.

Figure 17:
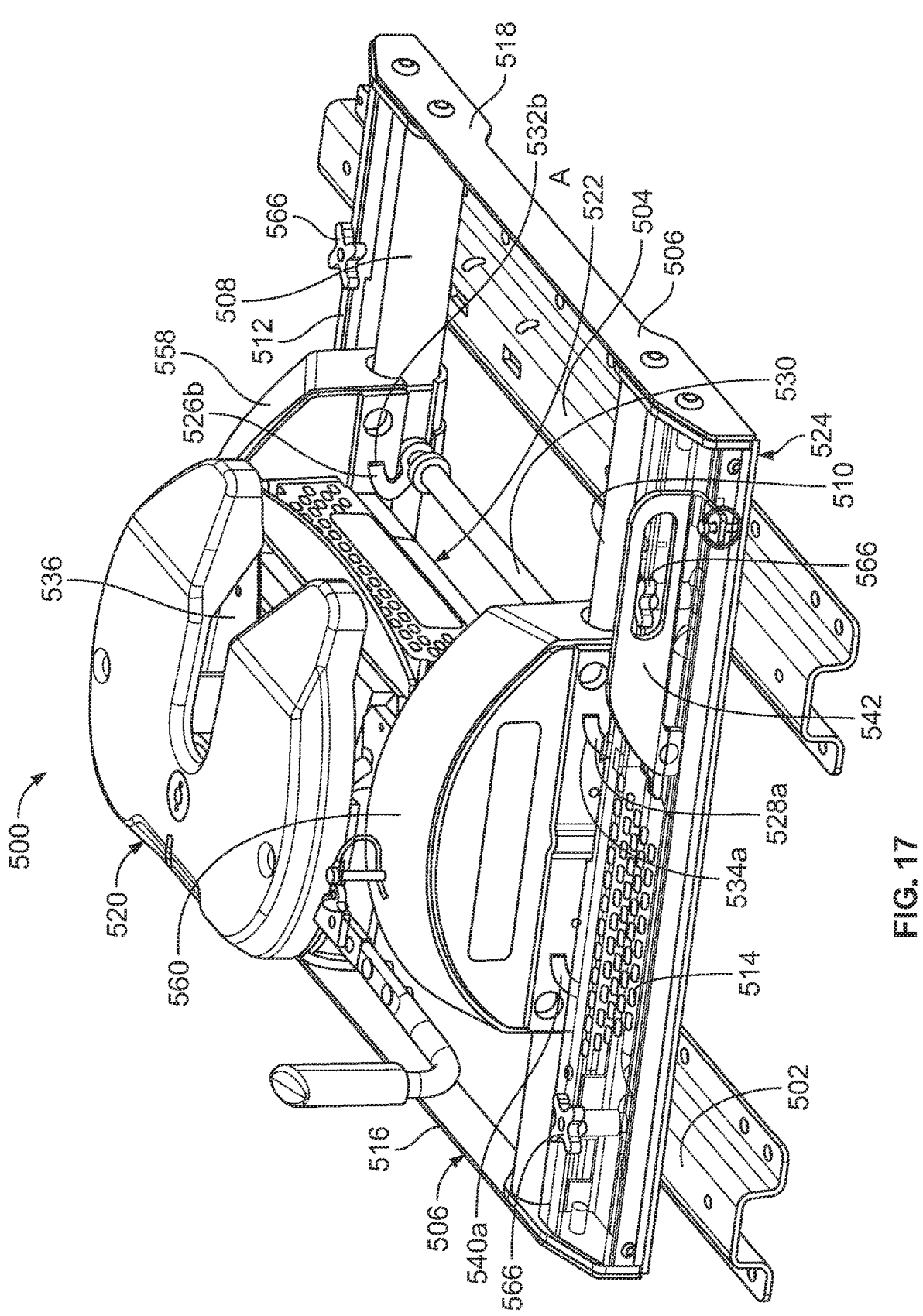
FIG. 17 is a side perspective view of a fifth wheel hitch according to one embodiment of the present disclosure.

Turning to one embodiment of the present disclosure, a fifth wheel hitch 500 is illustrated in FIG. 17, where fifth wheel hitch 500 comprises at least two mounting brackets (or mounting rails) 502 and 504 that are positioned in a substantially parallel relationship to one another, and a frame 506, where the frame is operatively coupled to the top surfaces of at least two mounting brackets (or mounting rails) 502 and 504. The at least two mounting brackets (or mounting rails) 502 and 504 are designed to permit fifth wheel hitch 500 to be secured to a desired towing vehicle (e.g., the bed of a truck, etc.). It should be noted that reference to the Figures is made from the vantage point labeled "A" in FIG. 17 in order to determine the left, right, front and back sides of fifth wheel hitch 500. The front side of fifth wheel hitch 500 is the side immediately in front of "A" in FIG. 17, while the remainder of the left, right and back sides are evident once the front side has been established as detailed above.

As can be seen in FIG. 17, frame 506 is comprised of at least two locator rails 508 and 510 that may be located on the opposite sides of frame 506 so that the at least two locator rails 508 and 510 are positioned above and generally perpendicularly to mounting rails 502 and 504. Frame 506 further comprises at least two locking and/or latching rails 512 and 514 that, in one embodiment, are located outside of each of the at least two locator rails 508 and 510. Finally, the at least two locator rails 508 and 510 and the at least two locking and/or latching rails 512 and 514 are secured together to form frame 506 by end beams 516 and 518. Elements 508, 510, 512, 514, 516 and 518 together are operatively secured to one another by any suitable method (e.g., screws/bolts, rivets, welding, etc.) so as to form a generally square shaped frame 506 that is capable of receiving a fifth wheel head 520 that is mounted on a center section pivoting box 522, where the pivoting box 522 is fasten to a carriage configured to move relative to the frame 506. The carriage may include sliding towers 558 and 560. In an embodiment, sliding towers 558 and 560 may be configured to move horizontally relative to the locator rails 508, 510. The sliding towers 558 and 560 may also be configured to provide vertical height adjustment to allow for a user to fit the present teaching's fifth wheel hitch to any number of truck/trailer combinations, etc. Further still, the height of the fifth wheel head 520 may be vertically adjustable in any other manner, including, without limitation, by adjusting the attachment between the fifth wheel head 520 to a saddle or base, including a tower under the fifth wheel head 520 that is positionable relative to the saddle or base of the fifth wheel hitch, or by adjusting the vertical height of the saddle or base relative to the sliding towers 558 and 560. Alternatively, end beams 516 and 518 can be replaced by a sub-frame 524 that is generally rectangular and/or square in shape and is designed to permit the mounting of at least two locator rails 508 and 510 and at least two locking and/or latching rails 512 and 514 thereto (See FIG. 17). The frame 506 may also include a plurality of engagement members configured to be selectively engaged with "pucks" or receiving members positioned along a bed of a vehicle.

As can be seen from FIGS. 17 through 23, sliding towers 558 and 560 are able to move forward and backward on the at least two locator rails 508 and 510 and further comprises at least one sets of two latch fingers 526a and 526b located on either side of locator rail 508 and at least one other set of two latch fingers 528a and 528b located on either side of locator rail 510. In one embodiment, latch fingers 526a, 526b, 528a and 528b are designed to hold sliding towers 558 and 560 in position with regard to forward and backward movement relative to frame 506 on the at least two locator rails 508 and 510.

In another embodiment, latch fingers 526a, 526b, 528a and 528b are designed to hold sliding towers 558 and 560 in position with regard to movement forward and backward to frame 506 on the at least two locator rails 508 and 510, as well as enabling sliding towers 558 and 560 to be held in a desired vertical based on movement up and down relative to frame 506. In this embodiment, latches 526a, 526b, 528a and 528b are curved and/or arced and pivot in a arcing fashion to permit control of sliding towers 558 and 560 in the two planes of motion (vertical and horizontal) as discussed above.

Figure 23:
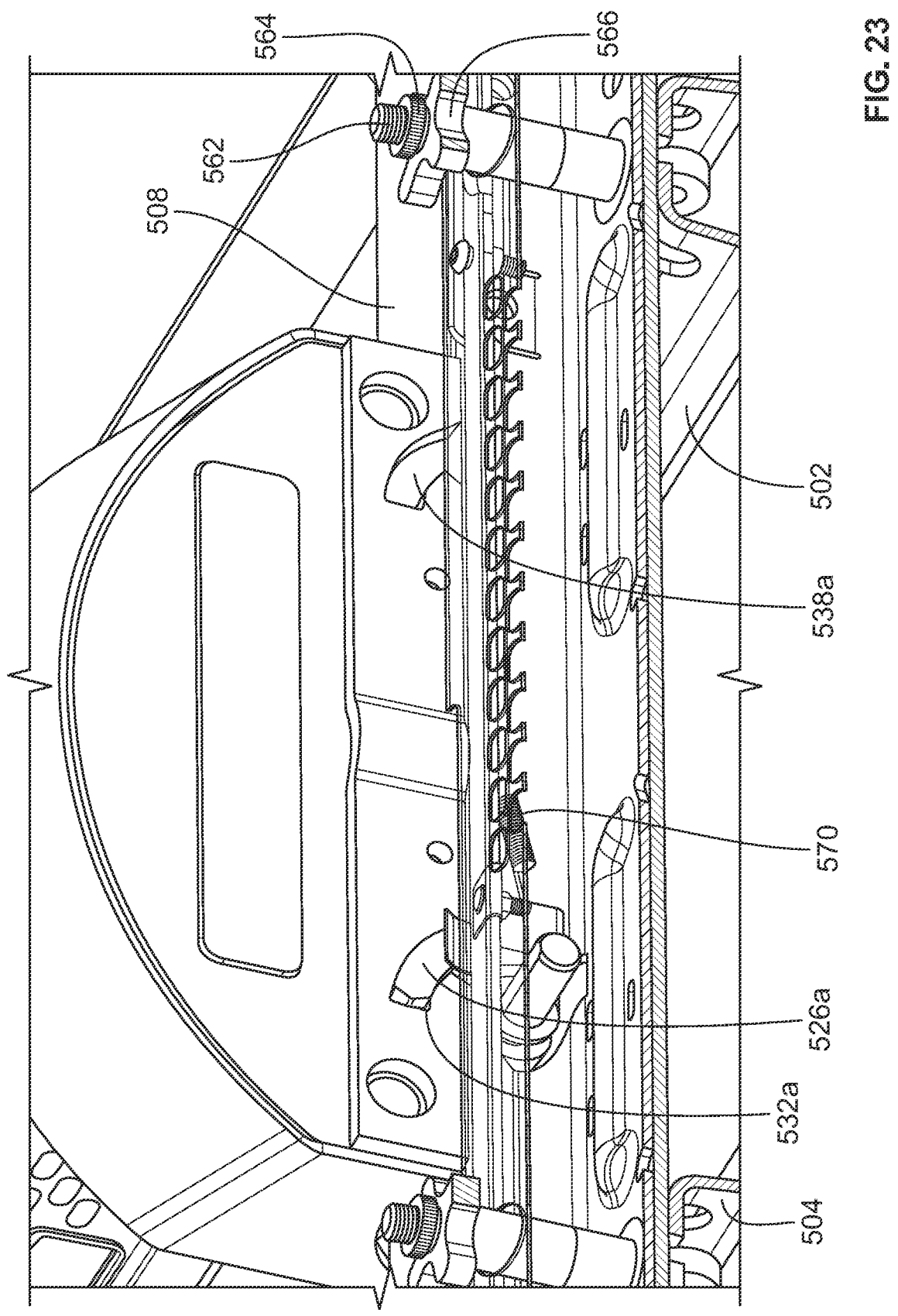
FIG. 23 is a side view of a fifth wheel hitch according to one embodiment of the present disclosure.

As can be seen from FIGS. 17 and 23, latch fingers 526a, 526b, 528a and 528b are mounted on and in communication with each other due to spring loaded latch finger control bar 530. Each end of latch finger control bar 530 is mounted in a suitable fashion to at least one point of frame 506 so that sliding towers 558 and 560 can move forward and back on two locator rails 508 and 510 without interfering with the operation and connectivity of latch finger control bar 530.

Additionally, as is illustrated in FIGS. 17 through 23, center section pivoting box 522 has one pair of forward latch finger receptacles 532a and 532b located on either side of locator rail 508 where such forward latch finger receptacles 532a and 532b are designed to receive latch fingers 526a and 526b, respectively, when latch fingers 526a and 526b are in a locked position in conjunction with sliding towers 558 and 560 being in a forward locking position. As is illustrated further in FIGS. 17 through 22, sliding towers 558 and 560 has one pair of forward latch finger receptacles 534a and 534b (534b is not shown) located on either side of locator rail 510 where such forward latch finger receptacles 534a and 534b are designed to receive latch fingers 528a and 528b, respectively, when latch fingers 528a and 528b are in a locked position in conjunction with sliding towers 558 and 560 being in a forward locking position. The term forward is used to describe latch finger receptacles 532a, 532b, 534a and 534b as these latch finger receptacles are in front of the hitch slot 536 of fifth wheel head 520 and positions head 520 closest to a cab (although in other embodiments, the forward position may result in the head 520 being furthest from the cab). The term forward locking position is used to describe the location of sliding towers 558 and 560 when it is positioned such that latch fingers 526a, 526b, 528a and 528b are aligned to latch/lock with latch finger receptacles 532a, 532b, 534a and 534b.

As is illustrated in FIGS. 17 through 23, sliding towers 558 and 560 have one pair of back latch finger receptacles 538a and 538b located on either side of locator rail 508 where such back latch finger receptacles 538a and 538b are designed to receive latch fingers 526a and 526b, respectively, when latch fingers 526a and 526b are in a locked position in conjunction with sliding towers 558 and 560 being in a backward locking position. As is illustrated further in FIGS. 17 through 23, sliding towers 558 and 560 has one pair of back latch finger receptacles 540a and 540b (540b is not shown) located on either side of locator rail 510 where such back latch finger receptacles 540a and 540b are designed to receive latch fingers 528a and 528b, respectively, when latch fingers 528a and 528b are in a locked position in conjunction with sliding towers 558 and 560 being in a backward locking position. The term back is used to describe latch finger receptacles 538a, 538b, 540a and 540b as these latch finger receptacles are behind hitch slot 536 of fifth wheel head 520. The term backward locking position is used to describe the location of sliding towers 558 and 560 when it is positioned such that latch fingers 526a, 526b, 528a and 528b are aligned to latch/lock with latch finger receptacles 538a, 538b, 540a and 540b and position head 520 farthest from a cab (although in some embodiments, the back position may result in the head 520 being closest to the cab).

Figure 24:
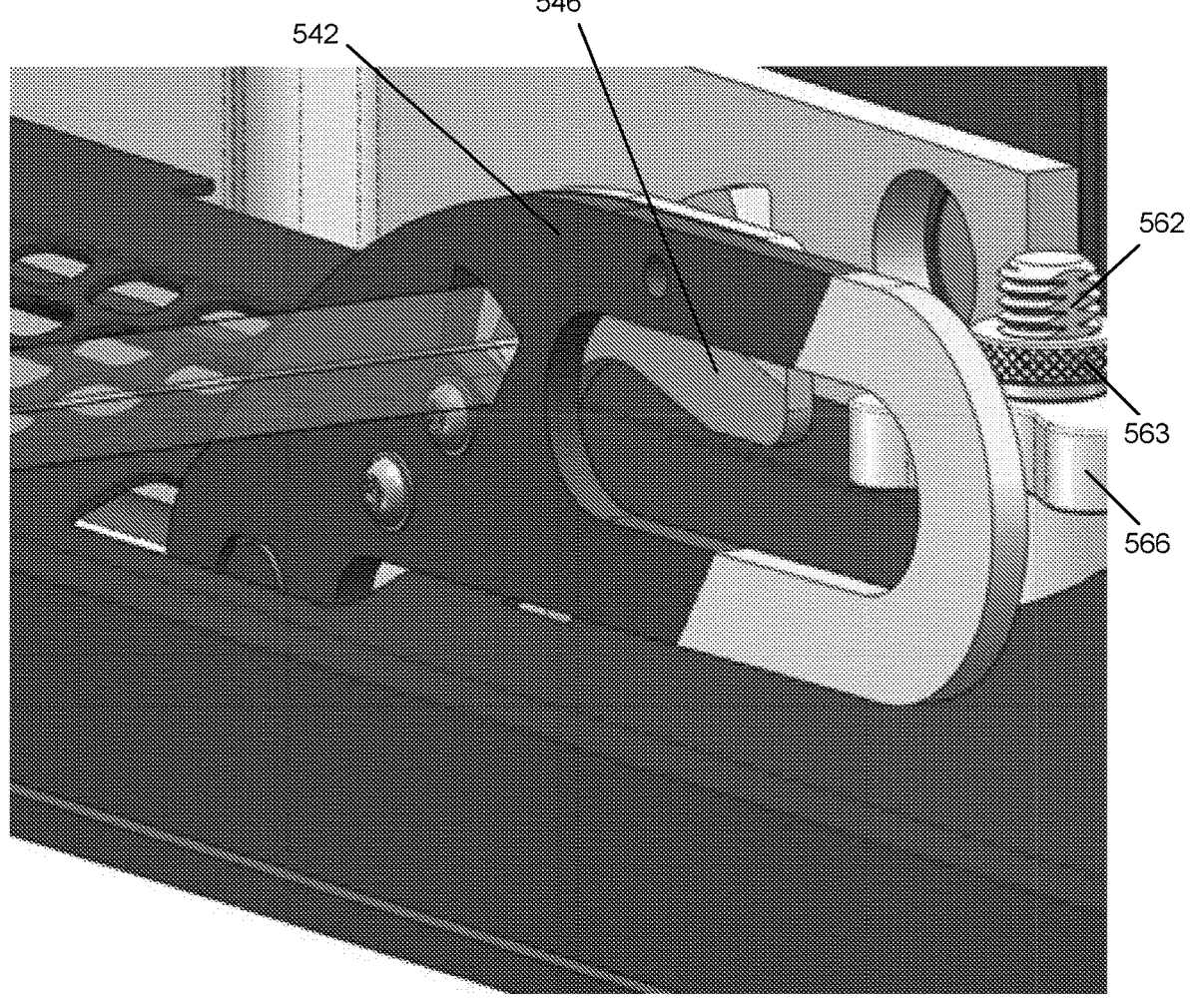
FIG. 24 is a close-up illustration of a safety latch on a latch control handle of the present disclosure, where the safety latch is in the closed position.
Figure 25:
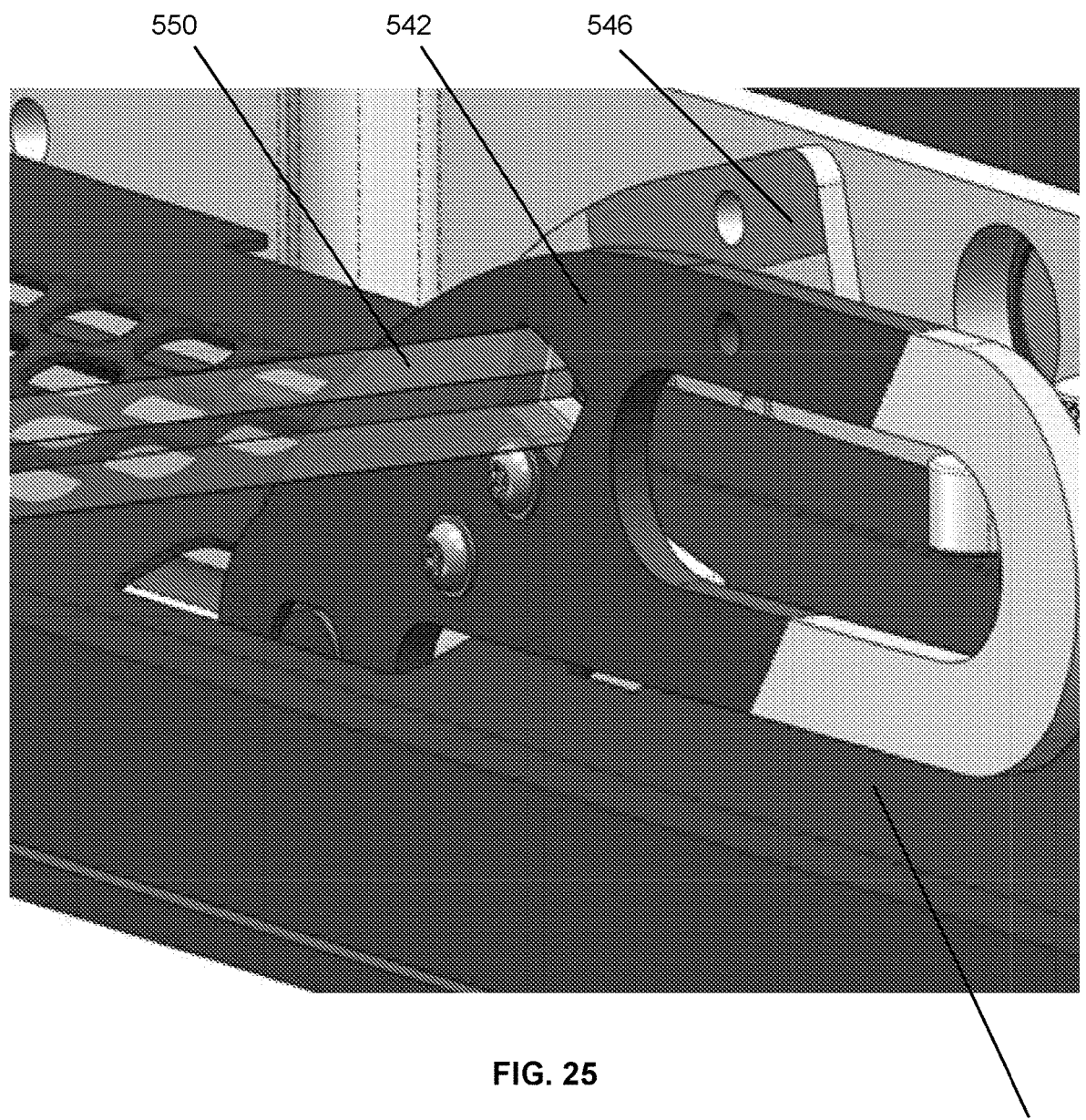
FIG. 25 is a close-up illustration of a safety latch on a latch control handle of the present disclosure, where the safety latch is in the open position.
Figure 26:
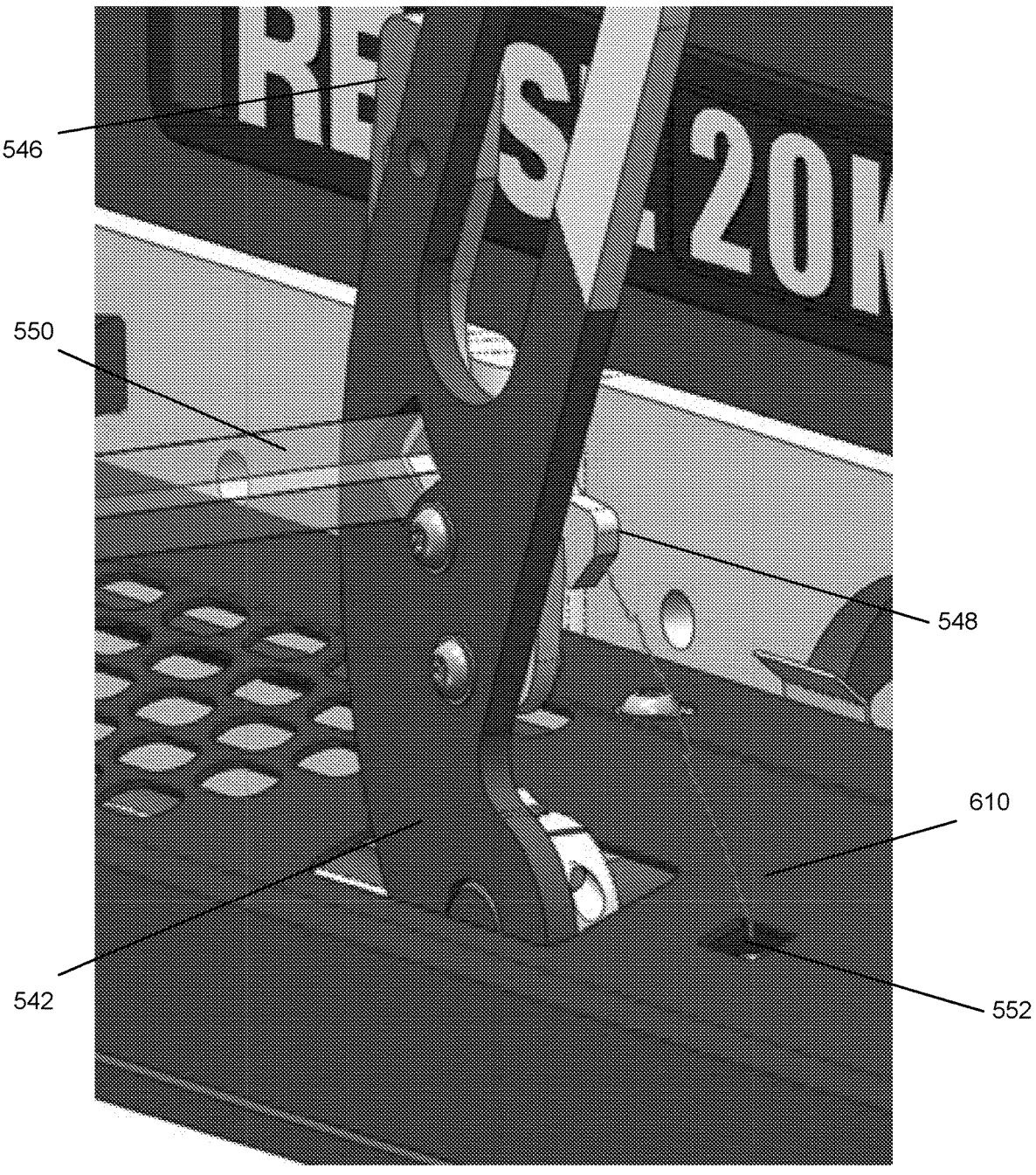
FIG. 26 is a close-up illustration of a safety latch on a latch control handle of the present disclosure, where the safety latch is in the open position and the latch handle is in the up unlatched position.
Figure 27:
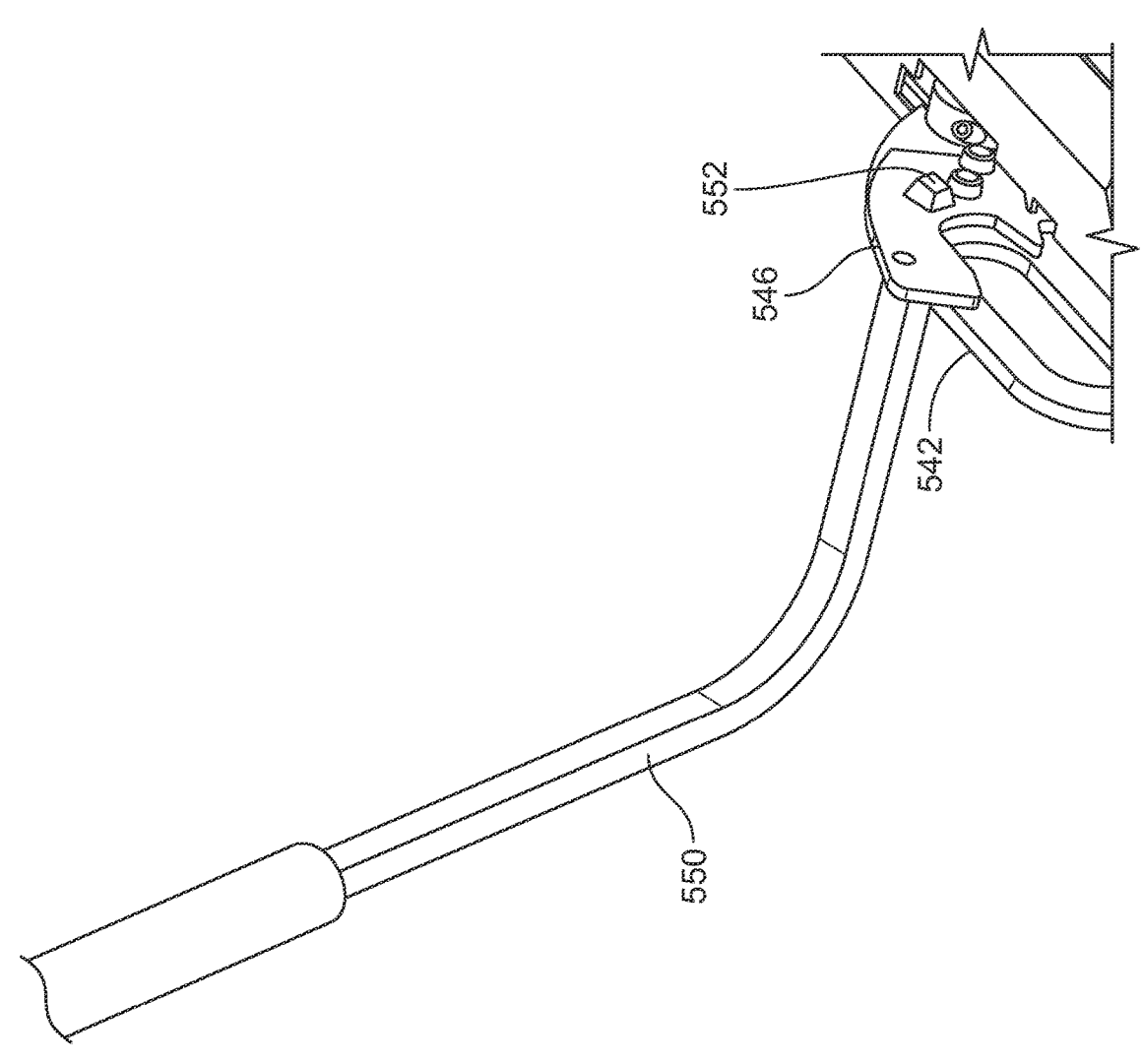
FIG. 27 is a close-up illustration of an optional reach handle that is designed for tall sided trucks and/or short people so that this design can permit an individual to easily unlatch the slider.

As is illustrated in FIGS. 18 through 21, latch finger control bar 530 has at least one latch control handle 542 on one side thereof. In another embodiment, latch finger control bar 530 is attached to at least one latch control handle 542. However, more than one latch control handle 542 contemplated herein and may be positioned on both or the same sides of locator rails 508, 510 thereof. FIGS. 24 through 27 illustrate an additional optional feature of the present disclosure where at least one latch control handle (or both latch control handles, if there are two present or more as applicable) has a safety latch 546 thereon such that safety latch 546 permits an additional level of safety when engaged such that safety latch 546 creates another item that has to be positively moved to permit the unlocking and moving of center section pivoting box 522. In another embodiment, if fifth wheel hitch 500 has two or more latch control handles 542, each latch handle 542 can independently have associated therewith a safety latch 546. Also in FIG. 22, mounting rails 502 and 504 can be replaced in some embodiments by a mounting plate 580, where frame 506 and/or locater rails 508 and 510 can be operatively fixed thereto. In another embodiment, safety latch 546 is visible to a user and can be color coded (green for locked and red for unlocked-see FIGS. 24 and 25, respectively) to allow a user to determine a position based on the color showing through latch control handle 542's hand hole. FIG. 26 is a close-up illustration of safety latch receiving hole 548 that is designed to permit safety latch 546 to lock into at least one portion of frame 506. Additionally, as is illustrated in FIG. 27 an optional reach handle 550 can be installed on at least one latch control handle 542 via engagement hole 552.

Figure 18:
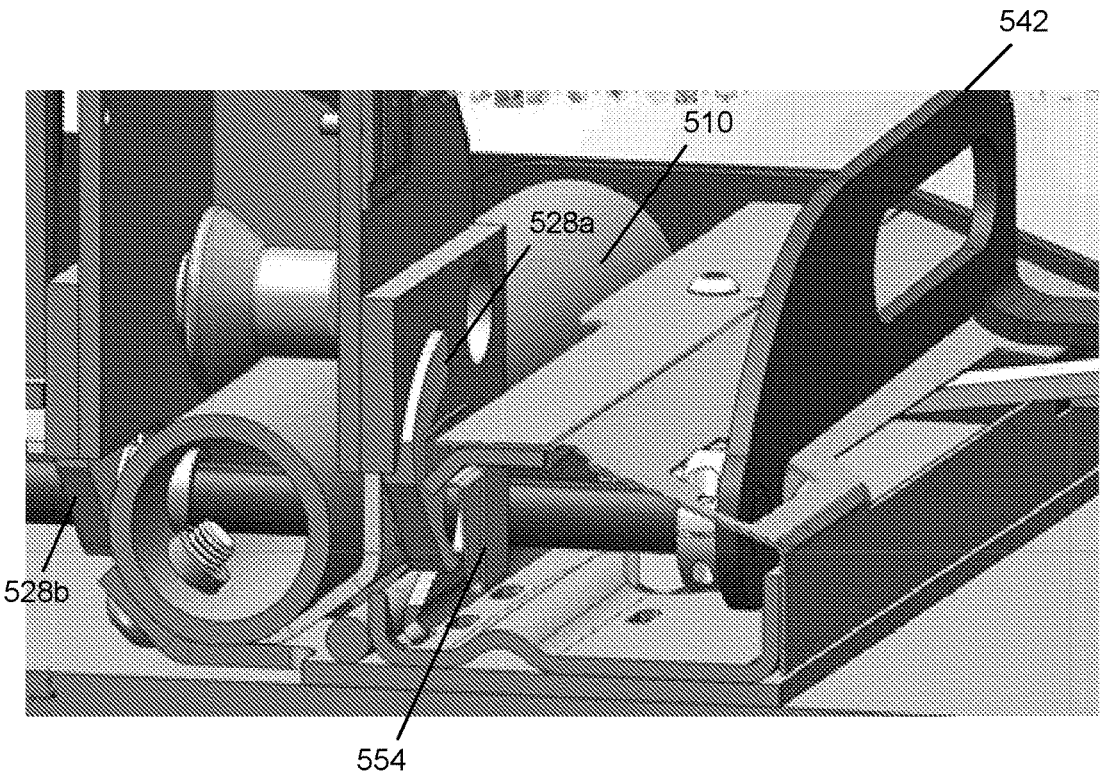
FIG. 18 is a cross-section view of one set of latch fingers one side of the sliding carriage portion of a fifth wheel hitch according to one embodiment of the present disclosure, where the latch fingers are engaged with, or locked into, one set of back latch receptacles, where the latch finger control bar is spring loaded in a direction which will force the one or more latch fingers to engage with one or more respective latch receptacles.
Figure 19:
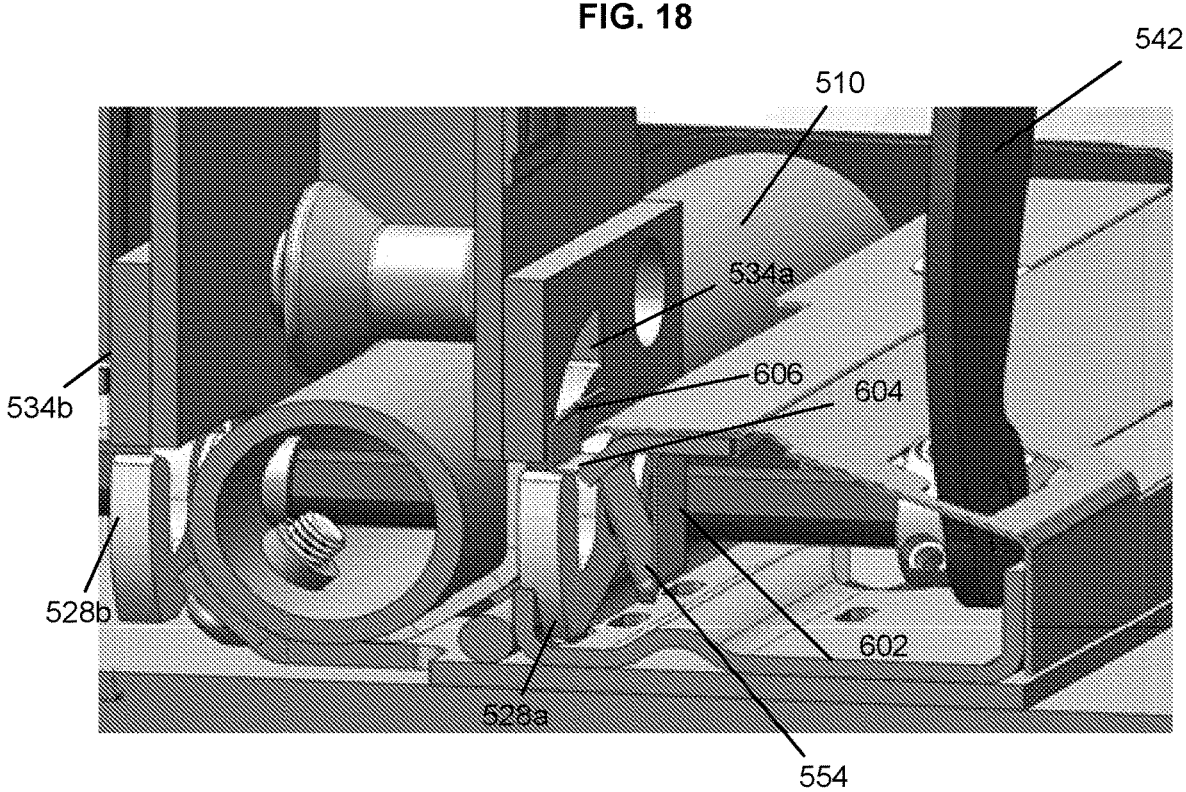
FIG. 19 is a cross-section view of one set of latch fingers one side of the sliding carriage portion of a fifth wheel hitch according to one embodiment of the present disclosure, where the latch fingers are disengaged from, or unlocked from, one set of back latch receptacles and prevented from re-engaging with one or more respective latch receptacles via a hold down spring, where the latch finger control bar is spring loaded in a direction which will force the one or more latch fingers to engage with one or more respective latch receptacles.

Given the above, FIG. 17 is a side perspective view of a fifth wheel hitch 500 according to one embodiment of the present disclosure. FIG. 18 is a cross-section view of one set of latch fingers 528a, 528b along a side of the sliding carriage portion of a fifth wheel hitch according to one embodiment of the present disclosure, where the latch fingers are engaged with, or locked into, one set of forward latch receptacles 534a, 534b, where the latch finger control bar is attached to a biasing member 570 that may be spring loaded (see FIG. 23) in a direction which will force the one or more latch fingers to pivot or otherwise engage with one or more respective latch receptacles. FIG. 19 is a cross-section view of one set of latch fingers 528a, 528b along a side of the sliding carriage portion of a fifth wheel hitch according to one embodiment of the present disclosure, where the latch fingers are disengaged from, or unlocked from, one set of forward latch receptacles 534a, 534b and prevented from re-engaging with one or more respective latch receptacles via a hold down or latch finger retaining spring 554 (see FIGS. 19 and 21), where the latch finger control bar 530 is spring loaded (see FIG. 23) in a direction which will force the one or more latch fingers to engage with one or more respective latch receptacles. In another embodiment, retaining spring 554 can be designed to hold one or more of the latch fingers in a down and out of way position such that center section pivoting box 522 is free to move. In still another embodiment, retaining spring 554 is configured to be manually disengaged such that the one or more latch fingers are free to disengage from their one or more respective latch receptacles. The retaining spring 554 provides a release if the center section pivoting box 522 is not in the appropriate locking or engaging position relative to the sliding towers 558 and 560. In such embodiments, the retaining spring 554, or more specifically, actuation of the retaining spring 554, may release engagement of the latch fingers 526a, 526b, 528a and 528b as applicable. This may make engagement and positioning of the center section pivoting box 522 easier. If there are any issues (e.g., positioning, engaging the wrong portion, or the like) actuation of the retaining spring 554 may allow release engagement of the latch fingers 526a, 526b, 528a and 528b as applicable. The retaining spring 554 may allow manual release of the latching mechanism.

In an embodiment, retaining spring 554 may include a generally continuous piece of spring steal having a spring portion 602, an engagement surface 604, and a depressible portion 606. The spring portion 602 may provide a bias force to the engagement surface 604 to position the engagement surface 604 towards the respective latch finger. The engagement surface 604 may selectively abut against an end of the latch finger in the locked position to prevent the latch finger from being pivoted towards the respective forward or back finger receptacles. The depressible portion 606 may be manually depressed by a user to disengage the engagement surface 604 from the edge of a respective latch finger to allow the latch finger to be pivoted or otherwise engage with the respective forward or back finger receptacles.

Figure 20:
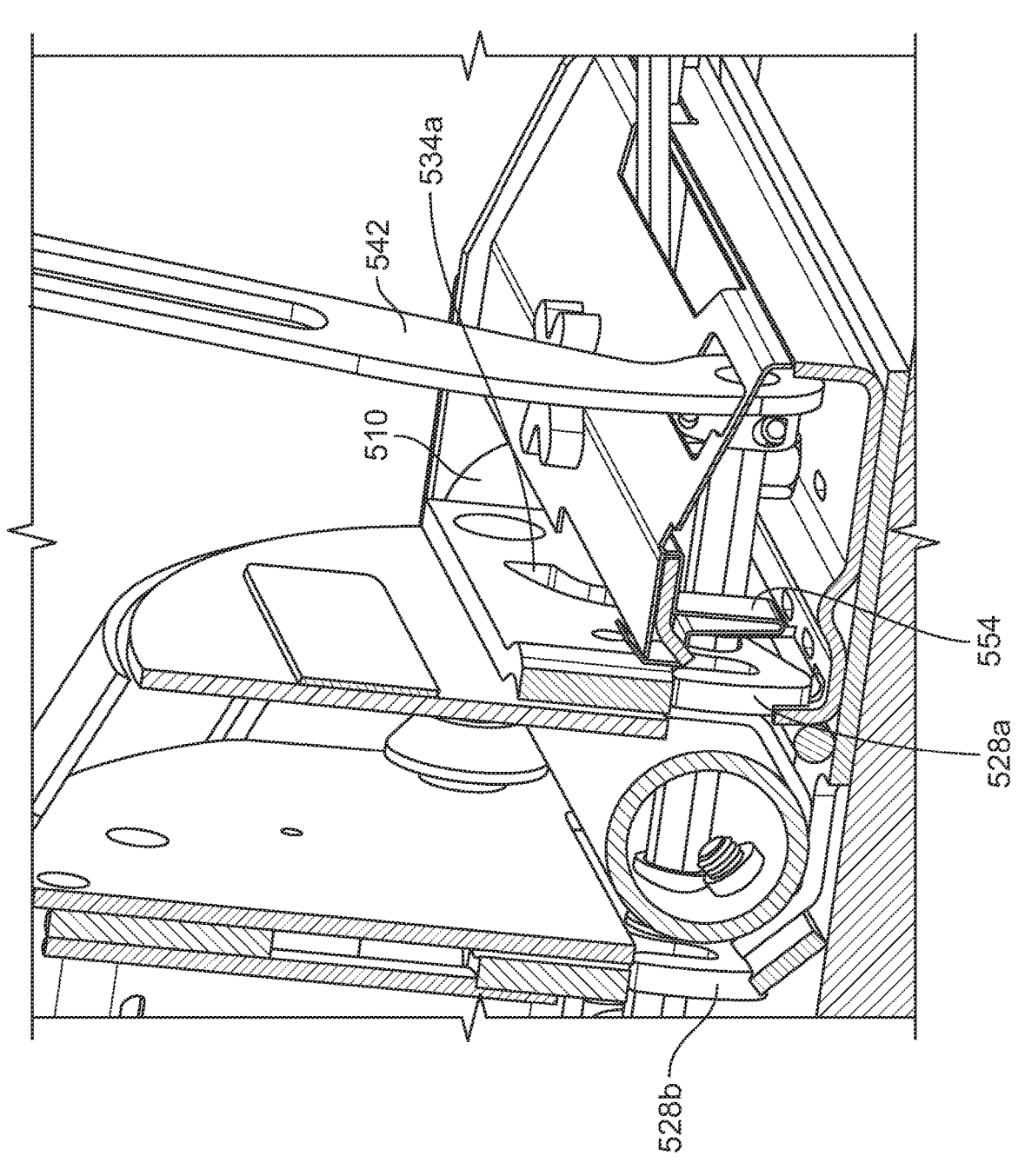
FIG. 20 is a cross-section view of one set of latch fingers one side of the sliding carriage portion of a fifth wheel hitch according to one embodiment of the present disclosure, where the latch fingers are disengaged from, or unlocked from, one set of back latch receptacles and where sliding carriage has been moved slight forward on its locator rails which disengages a hold down spring and permits one or more latch fingers to auto engage with one or more respective latch receptacles each latch finger encounters, where the latch finger control bar is spring loaded in a direction which will force the one or more latch fingers to engage with one or more respective latch receptacles.

Additionally, FIG. 20 is a cross-section view of one set of latch fingers one side of the sliding carriage portion of a fifth wheel hitch according to one embodiment of the present disclosure, where the latch fingers are disengaged from, or unlocked from, one set of forward latch receptacles and where sliding towers have been moved slight forward on its locator rails. A protrusion 608 may be positioned along a surface of the sliding tower 560 and may be configured to disengage retaining spring 554 and permits one or more latch fingers to auto engage with one or more respective latch receptacles each latch finger encounters, where the latch finger control bar is spring loaded (see reference numeral 570 in FIG. 23) in a direction which may force the one or more latch fingers to engage with one or more respective latch receptacles. The protrusion 608 may disengage the retaining spring 554 as the sliding towers 558, 560 are moved along the locator rails 508, 510 relative to the latch control handle 542 or spring loaded latch finger control bar 530. As such, a surface of the retaining spring 554 may be depressed by the protrusion 608 and disengage from the respective latch finger allowing the latch finger to be pivoted relative to the engagement surface 604 and therefor remain in an automatic engagement status while the sliding towers 558, 560 are moved into a desired place. The latch fingers may then automatically engage with the respective receptacles once in place.

Figure 21:
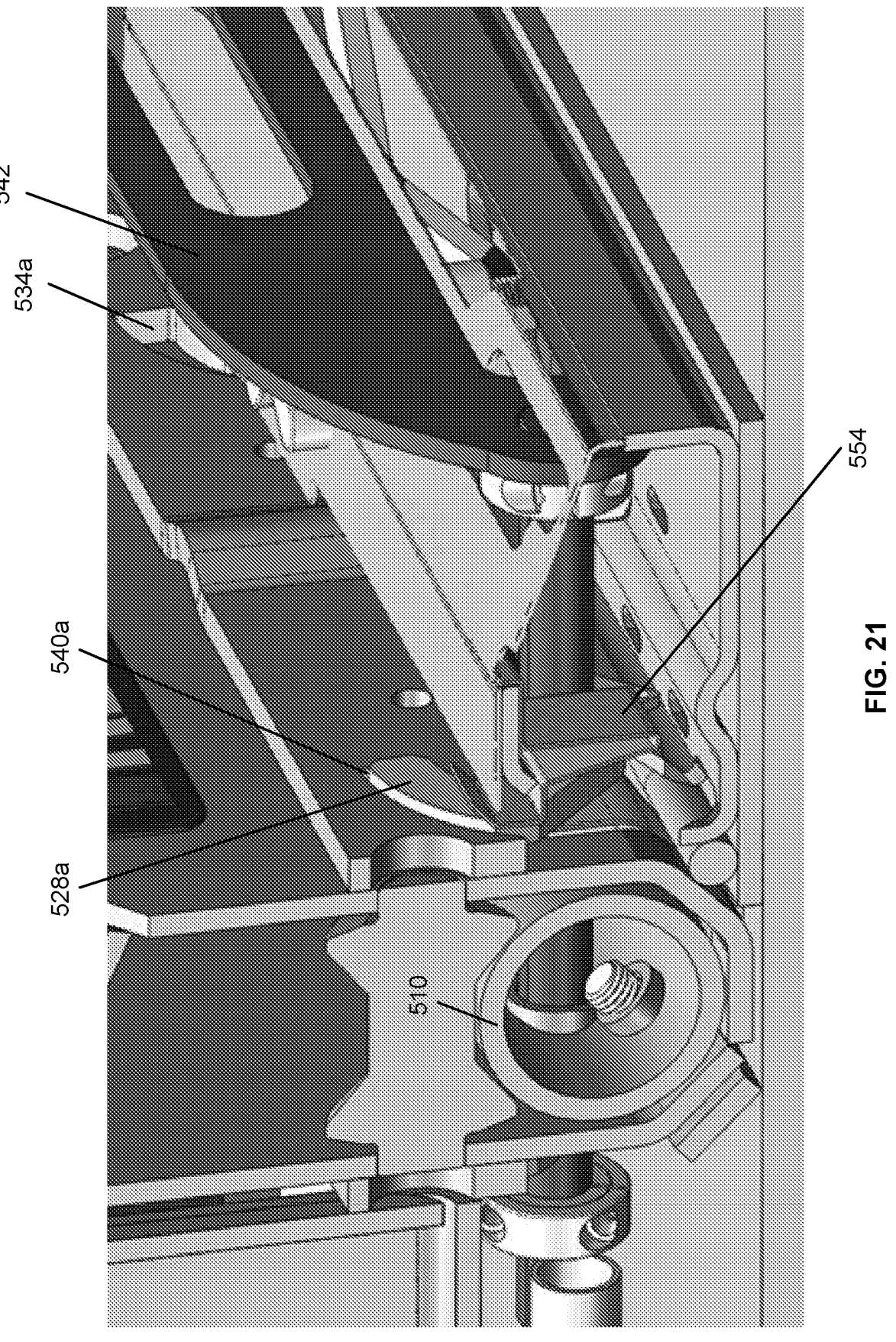
FIG. 21 is a cross-section view of one set of latch fingers one side of the sliding carriage portion of a fifth wheel hitch according to one embodiment of the present disclosure, where the latch fingers are engaged with, or locked into, one set of forward latch receptacles, where the latch finger control bar is spring loaded in a direction which will force the one or more latch fingers to engage with one or more respective latch receptacles.
Figure 22:
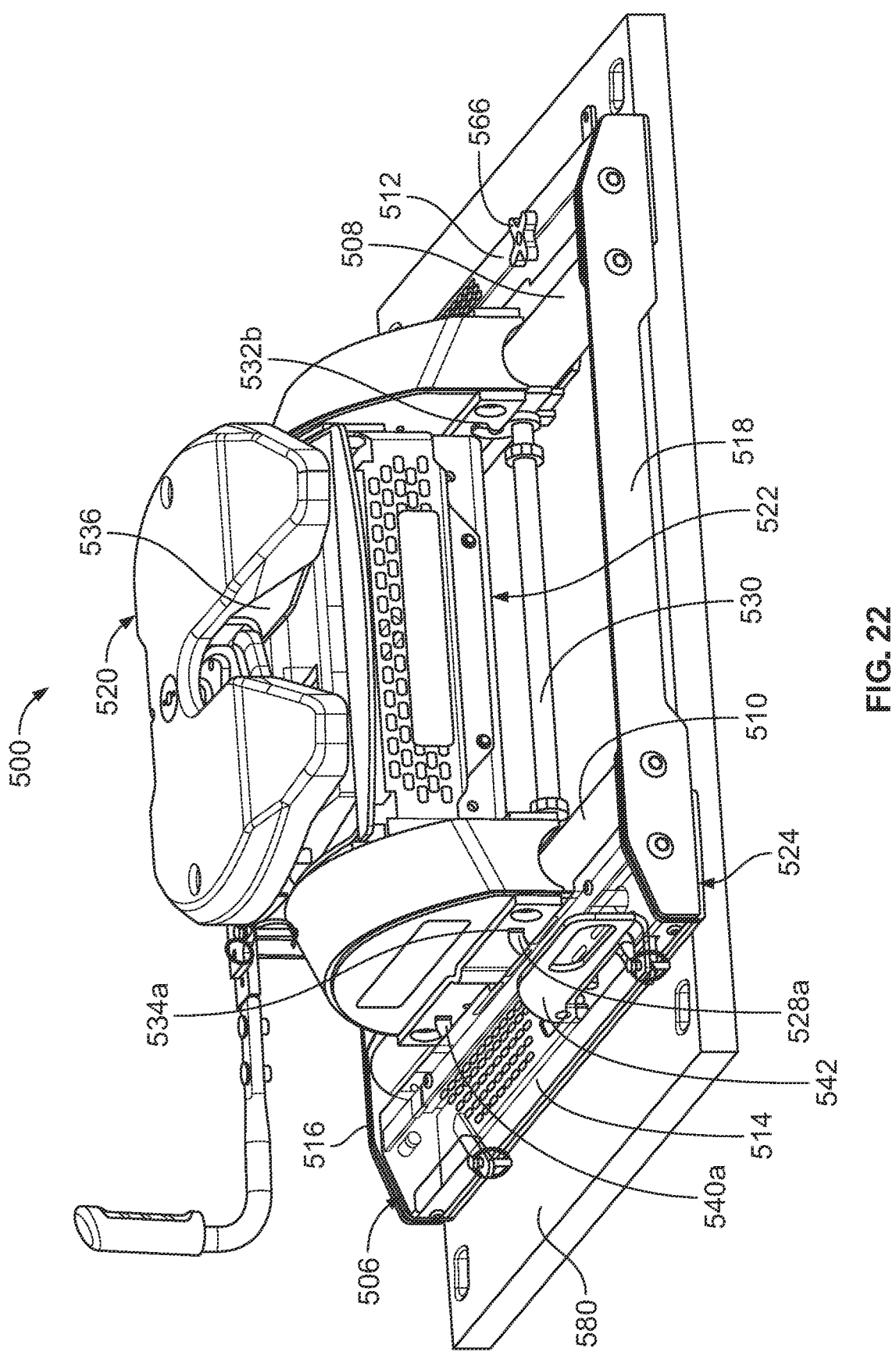
FIG. 22 is a front perspective view of a fifth wheel hitch according to one embodiment of the present disclosure illustrating a fifth wheel slider hitch where such a hitch is engaged into a "puck" attachment of a truck (or other suitable vehicle)

FIG. 21 is a cross-section view of one set of latch fingers one side of the sliding tower portion of a fifth wheel hitch according to one embodiment of the present disclosure, where the latch fingers are engaged with, or locked into, one set of back latch receptacles, where the latch finger control bar is spring loaded (see reference numeral 570 in FIG. 23) in a direction which will force the one or more latch fingers to engage with one or more respective latch receptacles; and FIG. 22 is a front perspective view of a fifth wheel hitch according to one embodiment of the present disclosure illustrating a fifth wheel slider hitch where such a hitch is engaged into a "puck" attachment of a truck (or other suitable vehicle). Here the puck attachment may be located within the mounting plate 580 that may be a part of a vehicle or may be provided with the fifth wheel hitch assembly 500.

Also, FIG. 23 is a side view of a fifth wheel hitch according to one embodiment of the present disclosure. FIG. 24 is a close-up illustration of a safety latch on a latch control handle of the present disclosure, where the safety latch 546 is in the closed position. FIG. 25 is a close-up illustration of the safety latch 546 on a latch control handle 542 of the present disclosure, where the safety latch 546 is in the open position. FIG. 26 is a close-up illustration of the safety latch 546 on the latch control handle 542 of the present disclosure, where the safety latch 546 is in the open position and the latch handle 542 is in the up unlatched position. FIG. 27 is a close-up illustration of an optional reach handle 550 that is designed for tall sided trucks and/or short people so that this design can permit an individual to easily unlatch the latch handle 542.

In light of the above, the present disclosure has one or more advantages over other fifth wheel hitches including, but not limited to, one or more of the following. In one instance, the one or more latch fingers and receptacles may be placed along an exterior surface of the sliding towers or carriage. This configuration allows the fingers and their respective engagement or disengagement relative to the receptacles to be visible to a user instead of being covered up. Since the one or more latch fingers, or one or more sets of latch fingers, are visible to the user this permits a user to ascertain the ultimate location of the latch fingers and achieves a positive indicator of whether or not center section pivoting box 522 is latched. Another feature of the present disclosure is that the latch fingers not only hold the sliding carriage from moving forward and backwards along a first plane, but also hold the sliding carriage from moving vertically (upwards or downwards) due to their curved or arched shape and rotating movement action. In at least one embodiment of the present disclosure, there are four latch fingers for sufficient structural rigidity and visual sight from either side of the vehicle in which the fifth wheel hitch of the present disclosure is installed. In another embodiment, the at least one latch control handle is further equipped with a pin hole to lock the mechanism.

In another embodiment, the latching mechanism of the present disclosure further includes a hold down or latch finger retaining spring 554 (with the depressible portion 606 or tab to permit the manual release of a latch finger, or set of latch fingers, if needed. Further, the locator rails 508 and 510 may have a robust structure and may have a rounded an elongated configuration with an outer diameter of at least 2 inches, at least 2.5 inches, or even 2.75 inches or more to allow for less flexing of and more stiffness in locator rails 508 and 510.

In one embodiment, the present disclosure uses thermal flow drill and thermal flow tap to produce the fastening and pivoting features in the tube locator rails 508 and 510. In such embodiments (such as shown in FIG. 21), the tube locator rails 508 and 510 may comprise apertures, which may either be tapped or not tapped. Fasteners may be inserted into and through those apertures. In those apertures in which are tapped, the fastener may be threaded therein. For those apertures that are not tapped, the fastener may be inserted or a mechanical piece may be inserted in an operative manner. The thermal flow drill or thermal flow tap may produce the apertures with or without the aperture in a single manufacturing process. The mounting rails 502 and 504 are bolted on to help with stability and packaging of the fifth wheel hitch into a smaller carton. The fifth wheel hitch of the present disclosure has, in one embodiment, different hole locations on its base and/or mounting rails 502 and 504 may be provided so that the hitch 500 is able to fit above bed rails, or various puck locations located within the vehicle beds of certain manufacturers or others as needed.

Latch control handle 542 has a secondary safety latch 548 that engages an exterior rail panel 610 providing another level of confidence to a user (see FIGS. 25 and 26). This secondary safety latch 548 may be activated while the unlatching handle 546 is lifted (see FIG. 24). In another instance, a hole 552 is provided for a lock to secure the secondary safety latch 548 into position (see FIG. 26) along the exterior rail panel 610.

Optional handle 550 may be provided for added mechanical advantage designed for tall sided trucks or short people to easily unlatch the handle 542. This provides extra reach and a mechanical advantage to lower the force required. This is also sized so that a user can use a typical ½" ratchet with a ½" extension to perform the same function (see FIG. 26).

Finally, the present disclosure may utilize one or more threaded eye bolt 562, threaded nut and/or retaining washer 564 and knob 566 in combination so that a user is able to tighten frame 506 relative to mounting rails 502 and 504 in order to provide a tight joint between frame 506 and above mounting rails 502 and 504. This reduces rattle and/or movement of center section pivoting box 522 through the use of compressive forces. In another embodiment, a tension set-up could be used in place of one or more combinations of threaded eye bolt 562, threaded nut and/or retaining washer 564 and knob 566 to achieve the desired anti-rattle aims discussed above.

In light of the above, the present disclosure comprises a fifth wheel hitch that, in one embodiment, an actual latching mechanism that is visible while other fifth wheel hitches to date are not visible on others; and/or a fifth wheel hitch that comprises an unlatch handle that has a secondary closed retainer where while other fifth wheel hitches to date have no secondary closed retainer (i.e., a one-piece handle with no place to lock it in position); and/or a fifth wheel hitch that comprises an anti-rattle attachment that is infinitely adjustable versus prior art fifth wheel hitches that utilize shims or have no adjustment feature. Finally, the fifth wheel hitch of the present disclosure can optionally include an additional long handle whereas to date available fifth wheel hitches have not had such an option and to date a user using such prior art fifth wheel hitches must stretch or apply a large force to unlatch them on a dually (e.g., an F-350 or 3500) pickup.

Although the embodiments of the present disclosure have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A fifth wheel hitch assembly comprising:
a fifth wheel head configured to engage a towing vehicle;
a carriage member attached to said fifth wheel head;
a frame configured to be attached to a towing vehicle, said frame including at least one locator rail wherein said carriage is moveable along the at least one locator rail; and
a latching system positioned along the frame that is configured to restrict a movement of the carriage relative to the frame, said latching system comprising:
a control bar;
at least one receptacle positioned along said carriage member;
at least one latching finger configured to selectively engage with said at least one receptacle;
a latch control handle attached to said control bar and configured to pivot said control bar and said at least one latching finger relative to said at least one receptacle;
a biasing member attached to said control bar and configured to be spring loaded in a direction which will force said at least one latching finger to pivot towards or otherwise engage with said at least one receptacle; and
a retaining spring configured to selectively engage with said at least one latching finger and prevent said at least one latching finger from re-engaging with said at least one receptacle such that said carriage member is free to move relative to said frame when said retaining spring is engaged to said at least one latching finger.

2. The fifth wheel hitch assembly of claim 1, wherein said carriage member includes a first sliding tower spaced from a second sliding tower and said frame includes a first locator rail spaced from and generally perpendicular to a second locator rail, wherein said first sliding tower is movably attached to said first locator rail and the second sliding tower is movably attached to said second locator rail.

3. The fifth wheel hitch assembly of claim 1, wherein said latching system is in a locked position when said at least one latching finger is engaged to said at least one receptacle and is in an unlocked position when said at least one latching finger is not engaged to said at least one receptacle, wherein movement of said carriage member relative to said frame is restricted along at least a first plane of motion when said latching system is in the locked position.

4. The fifth wheel hitch assembly of claim 3, wherein said at least one receptacle is located along an exposed surface of said carriage member to allow said at least one latching finger to be viewed in the locked position.

5. The fifth wheel hitch assembly of claim 3, wherein said latching system further comprises a plurality of latch fingers positioned along said control bar.

6. The fifth wheel hitch assembly of claim 5, wherein said plurality of latch fingers positioned along the control bar includes a first latch finger and a second latch finger positioned along either side of said locator rail and a third latch finger and a fourth latch finger positioned along either side of a second locator rail spaced from said locator rail.

7. The fifth wheel hitch assembly of claim 3, wherein said at least one latching finger is shaped as an arched configuration and said at least one receptacle includes a shape which is generally complementary to said at least one latching finger.

8. The fifth wheel hitch assembly of claim 1, wherein said latch control handle comprises a secondary lockable safety mechanism.

9. The fifth wheel hitch assembly of claim 1, wherein said latching system is configured to restrict the movement of said carriage member relative to said frame in at least two planes of motion.

10. The fifth wheel hitch assembly of claim 1, further comprising an extension handle configured to be attached to and extend from said latch control handle to allow a user to pivot said control bar from said extension handle.

11. The fifth wheel hitch assembly of claim 1, wherein said frame further comprises at least one set of a threaded eye bolt and nut configured to facilitate structural attachment to at least one rail positioned along said towing vehicle wherein said at least one set of said threaded eye bolt and nut are configured to prevent rattle, movement and/or noise from said fifth wheel hitch.

12. The fifth wheel hitch assembly of claim 1, wherein said retaining spring comprises a spring portion, an engagement surface, and a depressible portion wherein the spring portion is configured to provide a bias force to position the engagement surface towards said latching finger; wherein said engagement surface is configured to selectively abut against an end of said latching finger to prevent said latching finger from pivoting towards the respective receptacle; and wherein said depressible portion is configured to be manually depressed by a user to disengage said engagement surface from the end of said latching finger to allow said latching finger to be pivoted or otherwise engage with the respective receptacle.

13. A fifth wheel hitch assembly comprising:
a fifth wheel head configured to engage a towing vehicle;
a carriage member attached to said fifth wheel head;
a frame configured to be attached to said towing vehicle, said frame including at least one locator rail wherein said carriage member is moveable along said locator rail; and
a latching system positioned along said frame, said latching system comprising:
at least one latching finger attached to a retaining spring and configured to selectively prevent said at least one latching finger from re-engaging with at least one receptacle,
a control bar attached to a biasing member and configured to be spring loaded in a direction which will force the at least one latching finger to pivot towards or otherwise engage with said at least one receptacle;
a latch control handle attached to said control bar;
wherein said latching system is in a locked positioned when said at least one latching finger is engaged to said at least one receptacle and is in an unlocked position when said at least one latching finger is not engaged to said at least one receptacle.

14. The fifth wheel hitch assembly of claim 13 wherein said at least one receptacle is located along an exposed surface of said carriage member to allow a user to view said at least one latching finger in the locked position.

15. The fifth wheel hitch assembly of claim 13, wherein said at least one latching finger is shaped as an arched configuration and said at least one receptacle includes a generally complementary shape as said at least one latch finger.

16. The fifth wheel hitch assembly of claim 13, further comprising an extension handle configured to be attached to and extend from said latch control handle to allow a user to pivot said control bar from the extension handle.

* * * * *